US012643480B2

(12) United States Patent
Lausch et al.

(10) Patent No.: US 12,643,480 B2
(45) Date of Patent: Jun. 2, 2026

(54) STOWABLE TAILGATE STEP ASSEMBLY

(71) Applicant: Multimatic Inc., Markham (CA)

(72) Inventors: Ryan Lausch, Markham (CA); James Hollingworth, Markham (CA); Ahmed Ibrahim, Markham (CA); Muamer Hodza, Markham (CA); Michael Gordon Lehti, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 19/107,975

(22) PCT Filed: Sep. 7, 2023

(86) PCT No.: PCT/CA2023/051180
§ 371 (c)(1),
(2) Date: Feb. 28, 2025

(87) PCT Pub. No.: WO2024/050633
PCT Pub. Date: Mar. 14, 2024

(65) Prior Publication Data
US 2026/0001489 A1      Jan. 1, 2026

Related U.S. Application Data

(60) Provisional application No. 63/451,377, filed on Mar. 10, 2023, provisional application No. 63/404,926, filed on Sep. 8, 2022.

(51) Int. Cl.
*B60R 3/02*      (2006.01)
*B62D 33/023*      (2006.01)

(52) U.S. Cl.
CPC .............. *B60R 3/02* (2013.01); *B62D 33/023* (2013.01)

(58) Field of Classification Search
CPC ................................ B60R 3/02; B62D 33/023
See application file for complete search history.

(56) References Cited

U.S. PATENT DOCUMENTS 5,205,603 A      4/1993  Burdette, Jr.
6,983,972 B2 *    1/2006  Tan .................... B62D 33/0273
                                                            296/57.1
(Continued)

FOREIGN PATENT DOCUMENTS

EP      2938534 B1 *  8/2020    ............. B62D 33/03
JP      H05505989 A    9/1993
(Continued)

OTHER PUBLICATIONS

International Search Report and Written Opinion for International Application No. PCT/CA2023/051180, date of mailing Nov. 9, 2023.

*Primary Examiner* — Jacob B Meyer
(74) *Attorney, Agent, or Firm* — Borden Ladner Gervais LLP; Brandon L. Evenson

(57) ABSTRACT

A stowable tailgate step assembly system comprises a frame with two interconnected frame arms adapted to be mounted longitudinally in a vehicle tailgate. A slide module, releasably latched to the frame, comprises two longitudinal carrier arms which translate in relation to the frame arms, and a step assembly. The step assembly comprises two slide arms which translate in relation to the carrier arms, and a first step and at least one additional step pivotally connected by at least one link rod to facilitate synchronous rotation of the steps. Control means to control rotation of the steps during translation of the carrier arms from a stowed position to an extended position are provided. Deployment means to control rotation of the steps between the extended position and a deployed position are also provided. A lock-out latch rotationally connected to at least one carrier arm engages at (Continued)

least one associated frame arm to prevent translation of the carrier arm in relation to the associated frame arm when the step assembly is in the extended position.

14 Claims, 33 Drawing Sheets

(56) References Cited

U.S. PATENT DOCUMENTS

| | | | |
|---|---|---|---|
| 7,261,357 B1 | 8/2007 | Bechen | |
| 8,444,201 B1 * | 5/2013 | Crawford | B60R 3/02 |
| | | | 296/50 |
| 9,487,147 B1 * | 11/2016 | Morrill | B60D 1/58 |
| 9,902,328 B1 * | 2/2018 | Mazur | B62D 33/0273 |
| 9,963,076 B1 * | 5/2018 | Bender | B60R 3/02 |
| 10,994,660 B2 * | 5/2021 | Ngo | B62D 33/0273 |

| | | | |
|---|---|---|---|
| 2007/0267842 A1 * | 11/2007 | Seibert | B60R 3/02 |
| | | | 280/166 |
| 2008/0143072 A1 * | 6/2008 | Parker | E06C 1/005 |
| | | | 280/166 |
| 2009/0072571 A1 * | 3/2009 | Elliott | B62D 33/0273 |
| | | | 296/62 |
| 2009/0273202 A1 * | 11/2009 | Heaman | B62D 33/0273 |
| | | | 296/26.1 |
| 2016/0311356 A1 * | 10/2016 | Krajenke | B60R 3/00 |
| 2021/0253030 A1 * | 8/2021 | Bender | B60R 3/02 |
| 2025/0249832 A1 * | 8/2025 | Vishwakarma | B60R 3/02 |
| 2025/0313153 A1 * | 10/2025 | Bansal | B60N 3/023 |
| 2026/0001489 A1 * | 1/2026 | Lausch | B60R 3/02 |

FOREIGN PATENT DOCUMENTS

| | | |
|---|---|---|
| JP | 2002144961 A | 5/2002 |
| JP | 2015000704 A | 1/2015 |

* cited by examiner

STOWABLE TAILGATE STEP ASSEMBLY

FIELD OF THE INVENTION

This invention is in the field of automotive vehicles and, in particular, step systems for pick-up trucks.

BACKGROUND

Pick-up trucks may be provided with a step feature to allow easier ingress and egress from the truck cargo bed when the tailgate is open. It is an advantage to stow any such step when not in use for safety and reduced wear. A variety of means have been used to stow and deploy such steps.

SUMMARY

A stowable tailgate step assembly has been developed. In an aspect of the invention, the stowable tailgate step assembly system comprises a frame with two interconnected frame arms adapted to be mounted longitudinally in a vehicle tailgate. The frame is adapted to receive a slide module which is releasably latched to the frame. The slide module comprises two longitudinal carrier arms which translate in relation to the frame arms, and a step assembly. The step assembly comprises two slide arms which translate in relation to the carrier arms, and a first step and at least one additional step pivotally connected by at least one link rod to facilitate synchronous rotation of the steps. Control means to control rotation of the steps during translation of the carrier arms from a stowed position to an extended position are provided. Deployment means to control rotation of the steps between the extended position and a deployed position are also provided. A lock-out latch rotationally connected to at least one carrier arm engages at least one associated frame arm to prevent translation of the at least one carrier arm in relation to the associated frame arm when the step assembly is in the extended position. The lock-out latch disengages from the associated frame arm when its associated slide arm translates into the at least one carrier arm to initiate stowage of the step assembly in the frame.

In a further aspect of the invention, the control means comprises a guide pin mounted to one of the first step and the at least one additional step which engages a shaped guide slot adjacent an end of at least one of the carrier arms.

In a further aspect of the invention, the control means comprises a first guide pin mounted to the first step, a guide bracket mounted to one of the carrier arms, and the guide bracket comprising a shaped guide slot to receive the first guide pin. The first guide pin is constrained from vertical movement by a motion control surface of the carrier arm and by the respective slide arm when the first guide pin is outside the shaped guide slot.

In a further aspect of the invention, the control means comprises a roller mounted to one of the first step and the at least one additional step which translates rotationally over a ramp mounted to at least one of the carrier arms.

In a further aspect of the invention, the deployment means comprises the steps pivotally connected to the slide arms with pivot pins, the steps being coplanar with the slide arms prior to deployment but rotating in relation to the slide arms to be parallel with a truck cargo bed when deployed, the steps pivotally connected to each other by at least one link rod to ensure synchronous and parallel rotation of the steps, at least one guide pin mounted at a lateral side of at least one of the steps, the guide pin contacting a motion control surface on the carrier arm to maintain the steps coplanar with the slide arms during deployment of the step assembly; a guide bracket including a guide slot located adjacent an aft end of the carrier arm to reversibly receive the guide pin, the guide slot shaped to impose a rotation of the step onto which the guide pin is mounted.

In a further aspect of the invention, the lock-out latch releasably engages a lock-out pin mounted to the step assembly to prevent extension of the step assembly in relation to the carrier arms until the slide module exits the frame.

In a further aspect of the invention, the slide module is releasably latched to the frame by at least one assembly latch which is released by means of a latch release handle.

In a further aspect of the invention, the tailgate step assembly is in a stowed position when latched by at least one assembly latch, in an extended position when the assembly latch is released and the slide module translates in relation the frame to a limit, and in a deployed position when the steps rotate to a use position.

In a further alternative aspect of the invention, the latch release handle is connected to at least one lateral arm which rotates at least one locking rod located between at least one of the slide arms and its associated carrier arm, the locking rod provided with a spring-loaded pawl adapted to lock into locking slots in at least one of the carrier arm and its associated frame arm.

In a further aspect of the invention, a load stop is rotatably mounted to an upward face of the step assembly.

In a further aspect of the invention, the load stop lies recessed in the first step when not in use.

In a further aspect of the invention, a load stop rotatably mounted to an upward face of the step assembly, when rotated perpendicular to the step assembly, is locked in place by means of the spring-loaded pawl engaging a locking slot in at least one of the carrier arms and its associated frame arm.

In a further aspect of the invention, a spring-loaded ratchet connected to the load stop and to one of the carrier arms and its associated slide module allows the load stop to be moved in small increments to be snug against a cargo, and releasing said ratchet allows the load stop to be moved far enough back from the cargo to be stored in the step assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments unless such features are incompatible.

DETAILED DESCRIPTION

Figure 1:
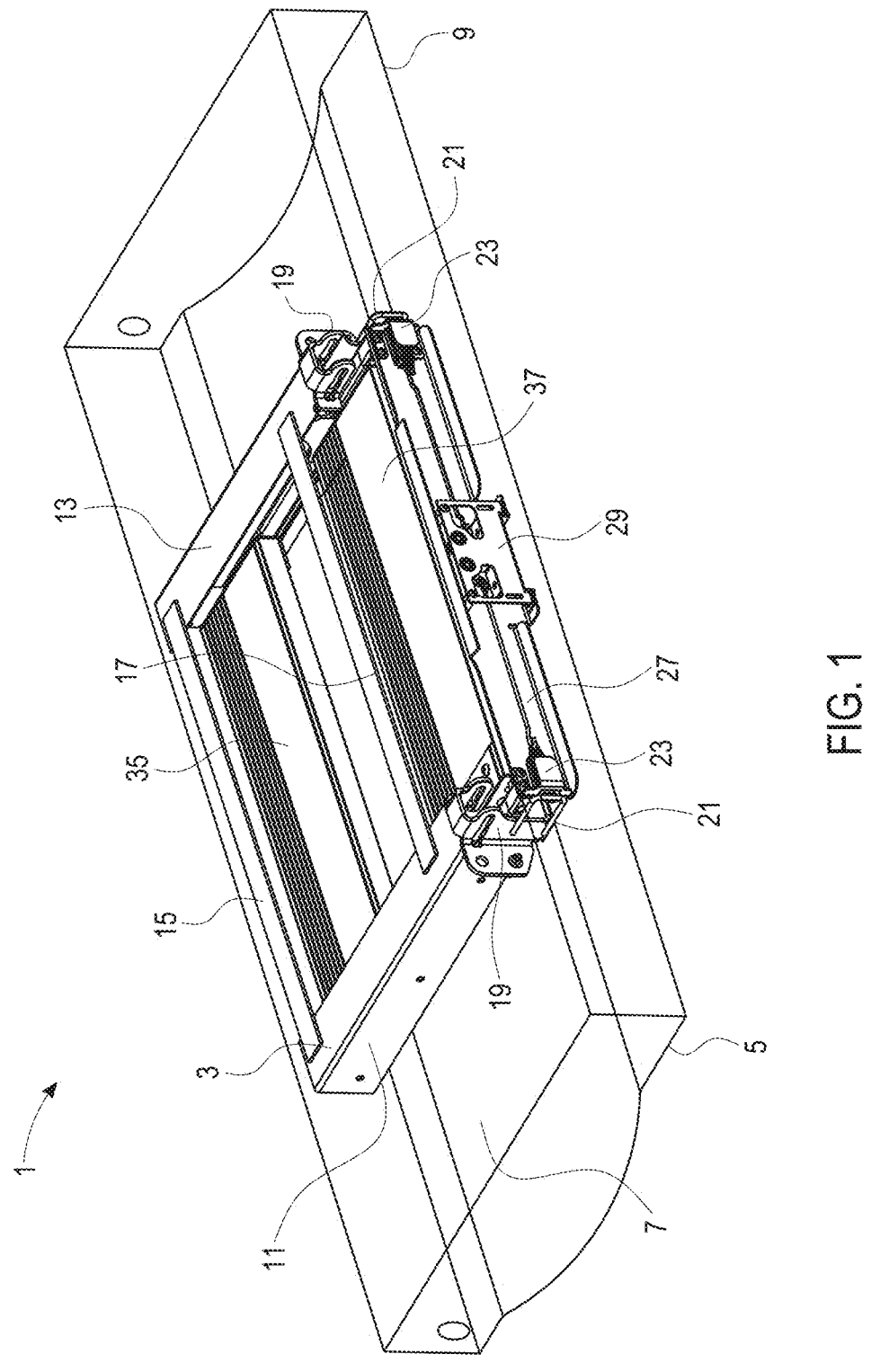
FIG. 1 is a perspective view of the stowable step assembly system mounted in a schematically illustrated tailgate.
Figure 2:
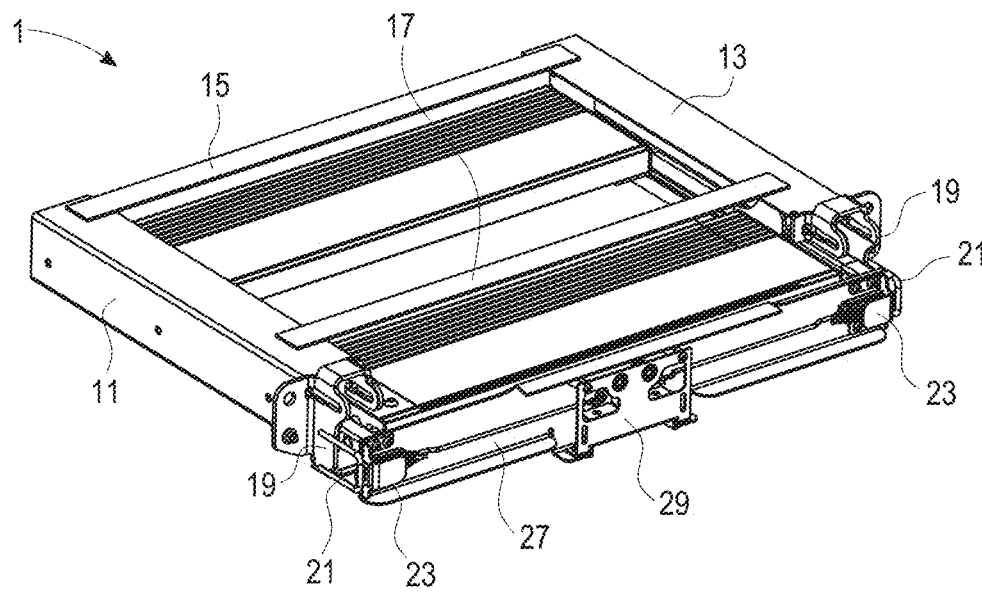
FIG. 2 is a perspective view of the stowable step assembly system in isolation.
Figure 3:
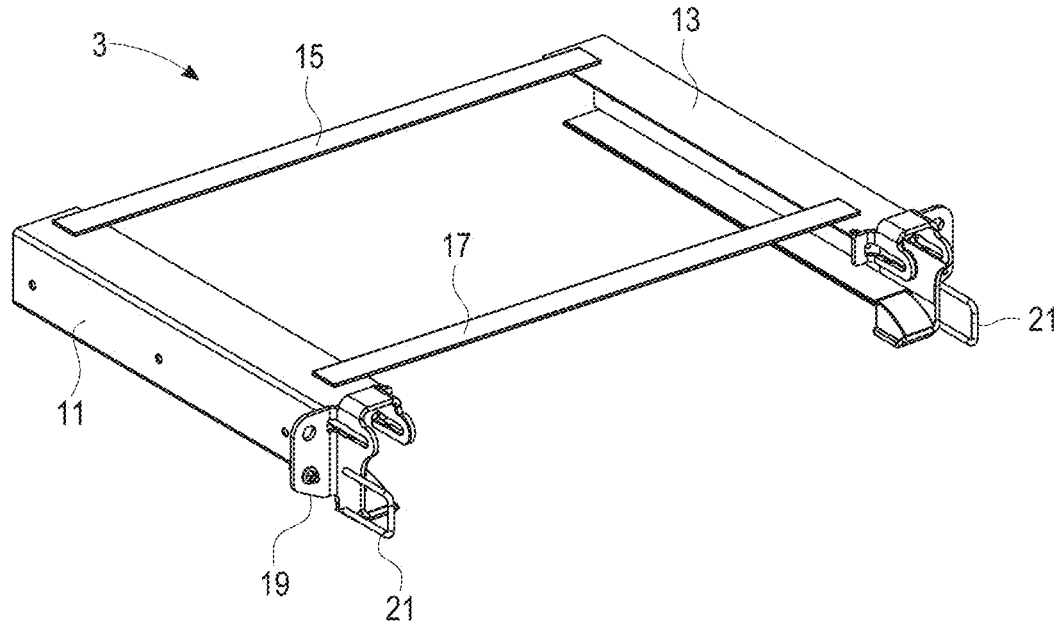
FIG. 3 is a perspective view of the frame of the stowable step assembly system.
Figure 4:
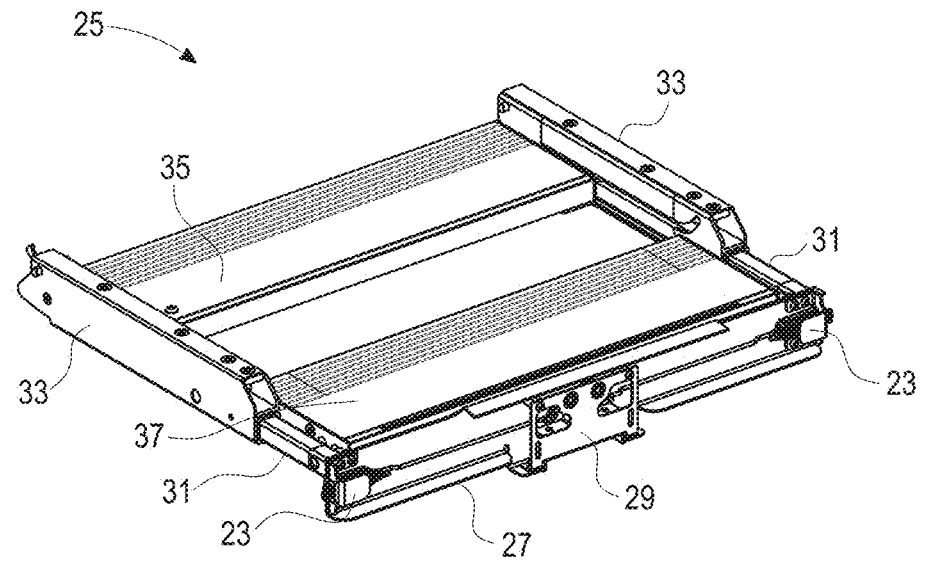
FIG. 4 is a perspective view of the slide module of the stowable step assembly system with the step assembly partially extended.
Figure 5:
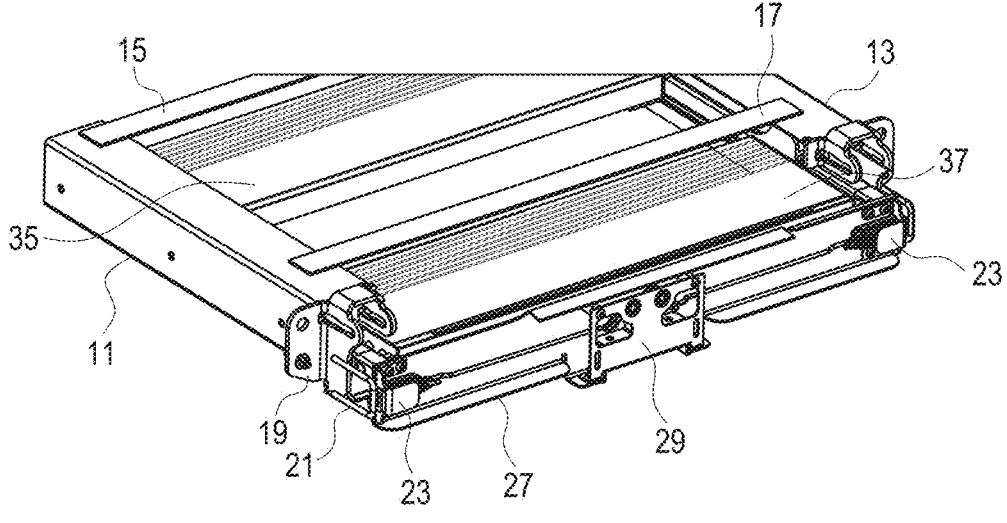
FIG. 5 is a partial, perspective view of the stowable step assembly system with the step assembly stowed.
Figure 6:
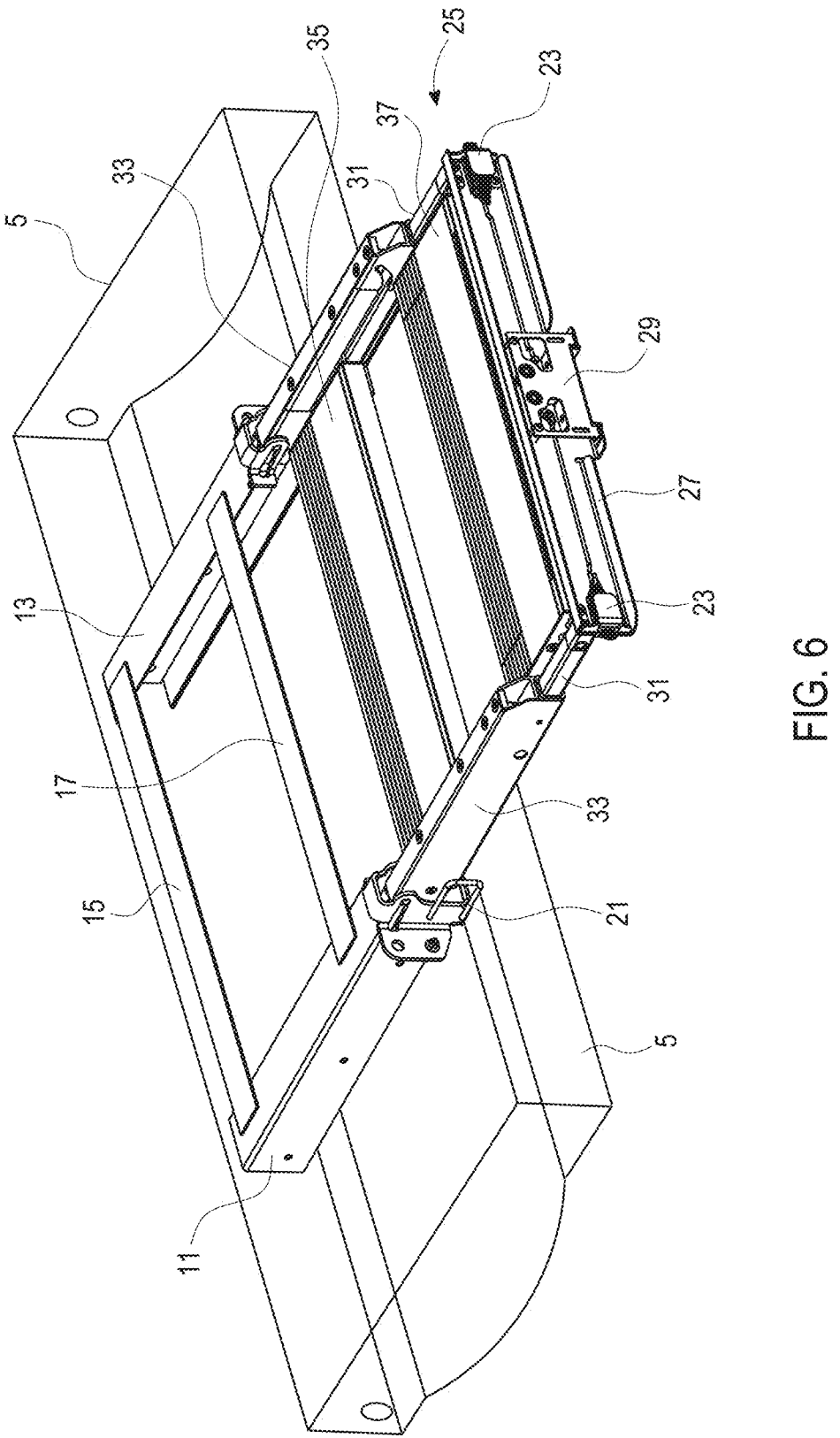
FIG. 6 is a perspective view of the stowable step assembly system with the carrier arms extended from the frame and the step assembly partially extended from the carrier arms.
Figure 7:
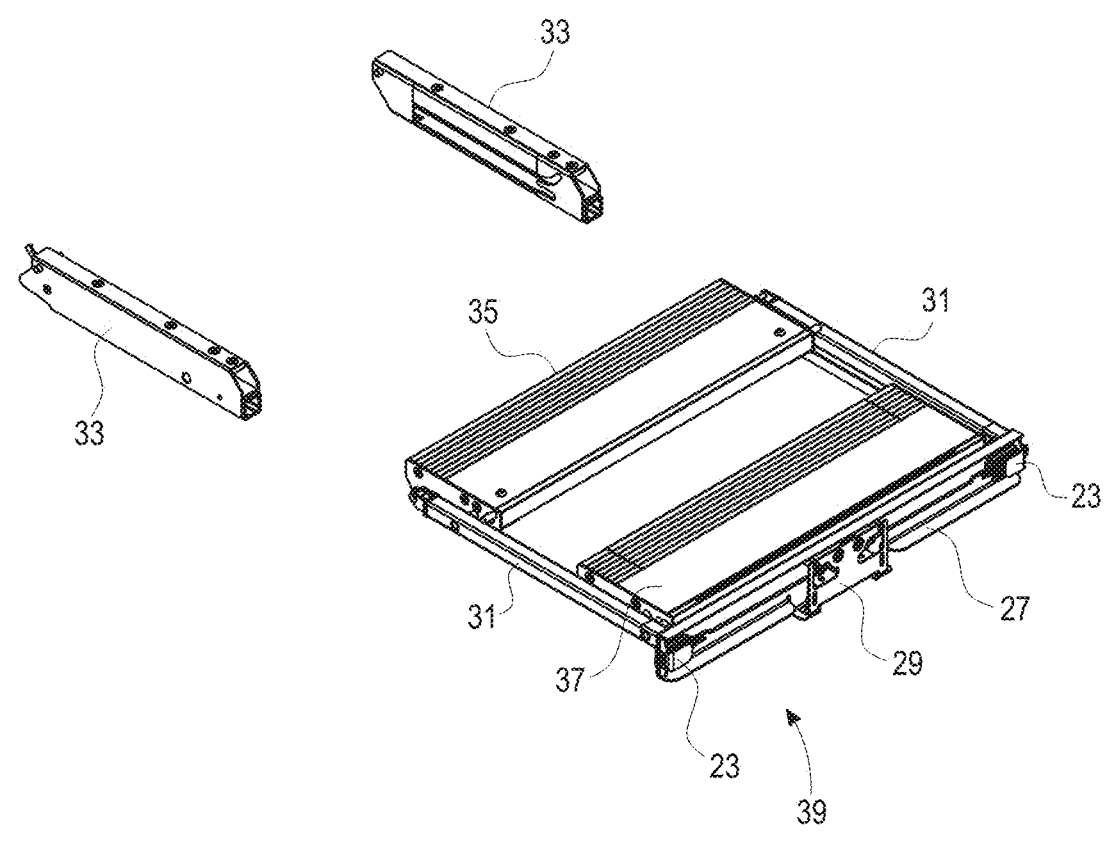
FIG. 7 is an exploded, perspective view of the slide module of the stowable step assembly system.
Figure 8:
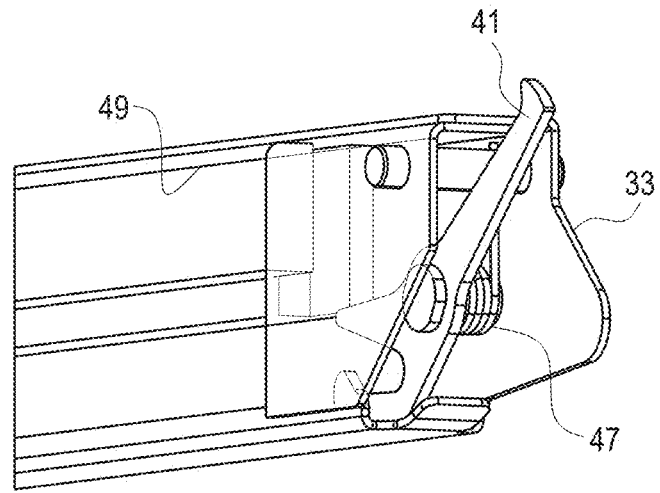
FIG. 8 is a partial, perspective view of the lock-out latch.
Figure 9:
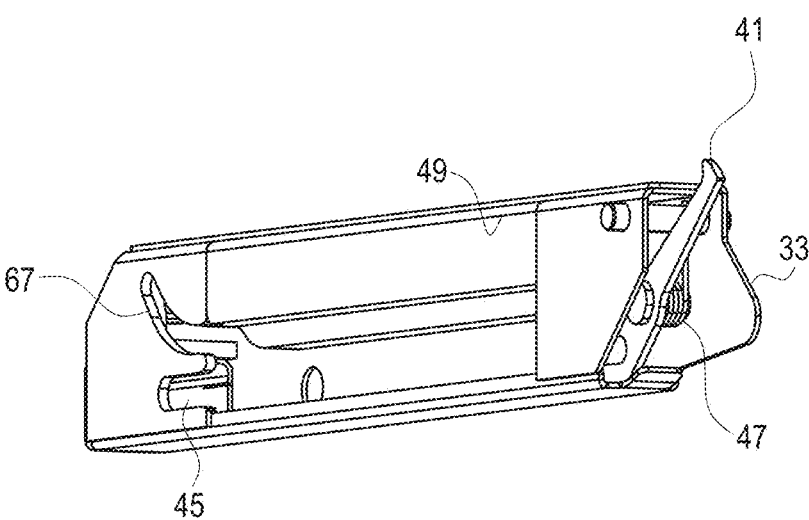
FIG. 9 is a further partial, perspective view of the lock-out latch showing a lock-out slot and a guide slot.
Figure 10:
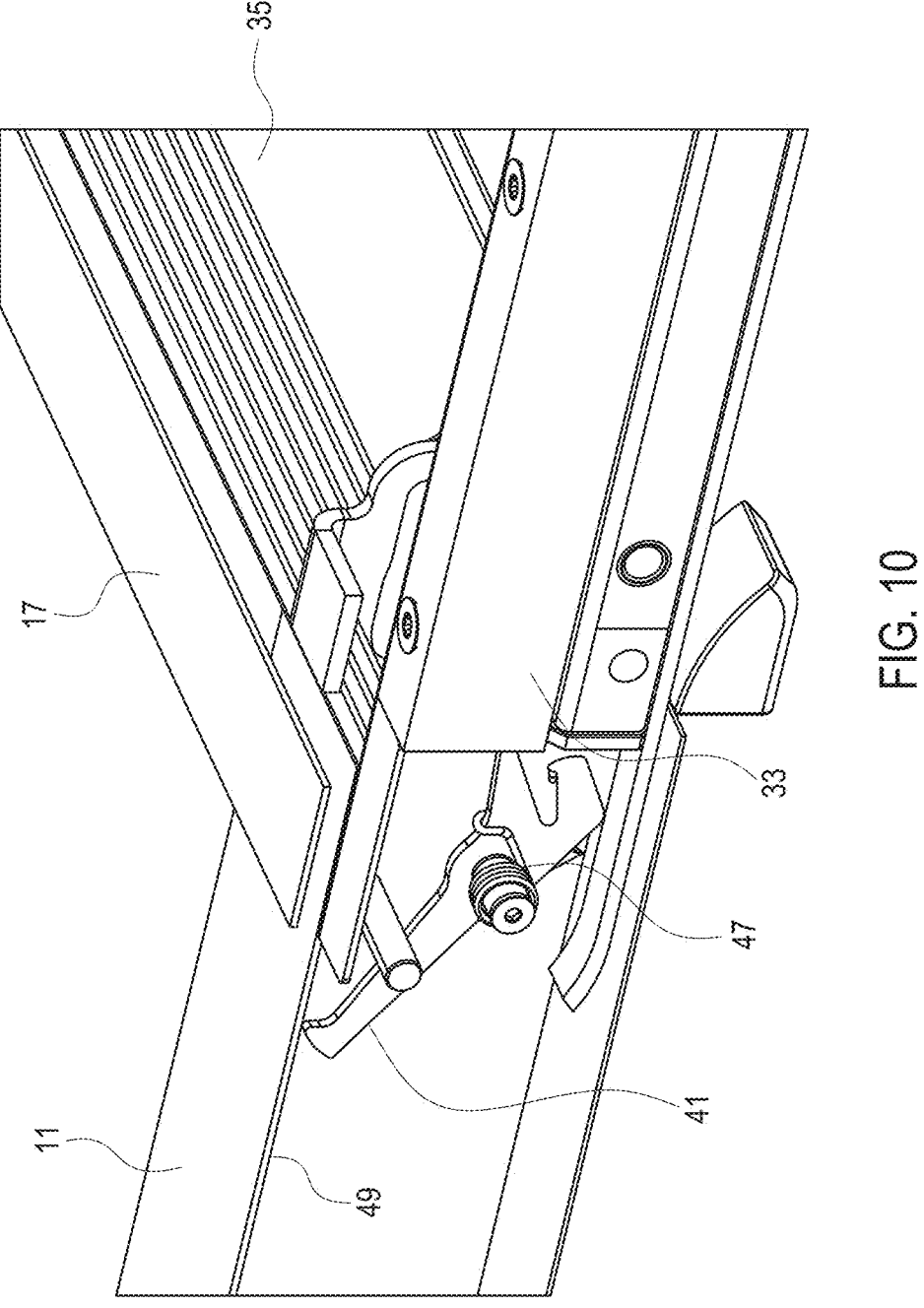
FIG. 10 is a partial, perspective view of the frame, the slide module and the lock-out latch with the slide module translated aft.
Figure 11:
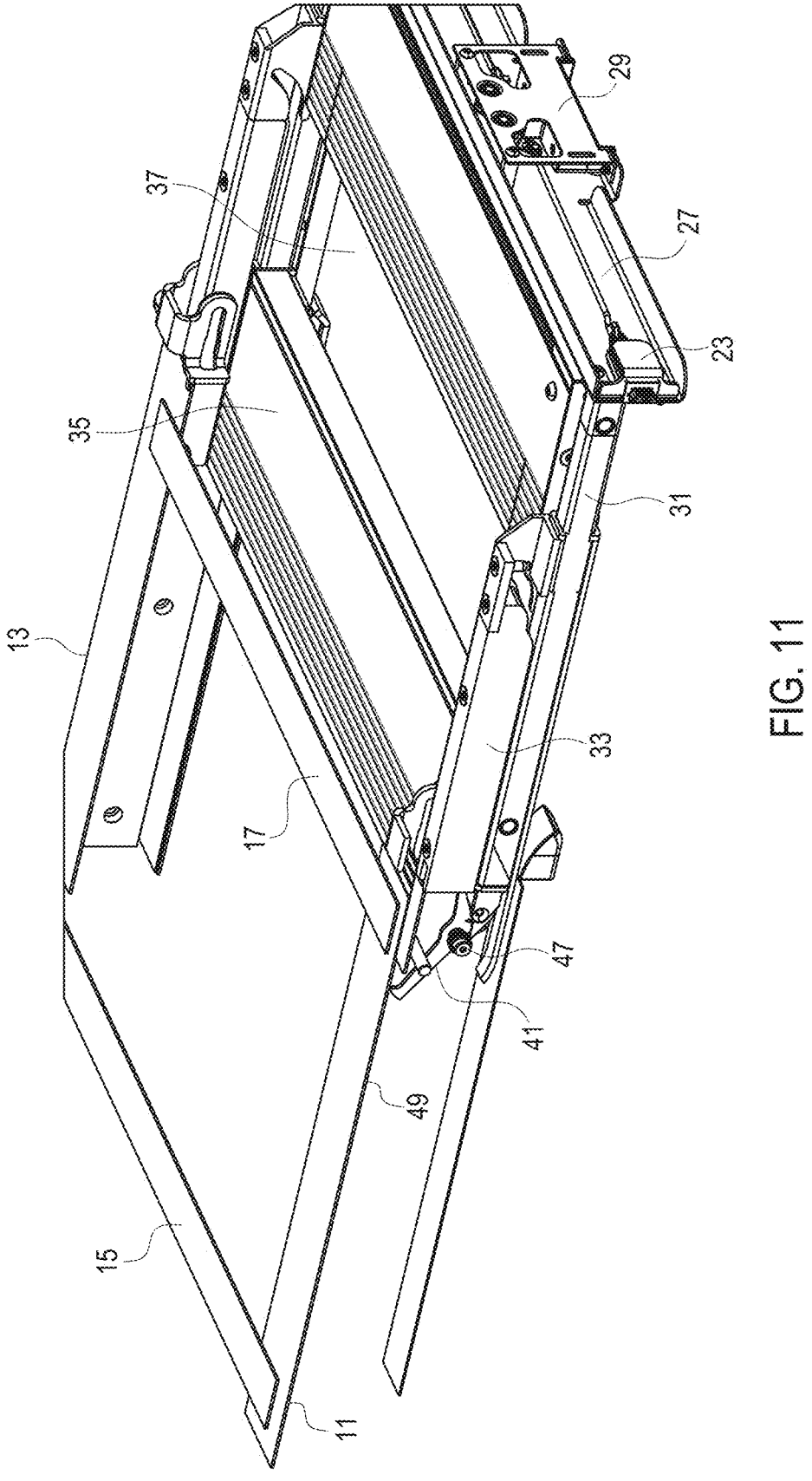
FIG. 11 is a partial, perspective view of the isolated stowable step assembly system with the lock-out latch in the orientation of FIG. 10.
Figure 12:
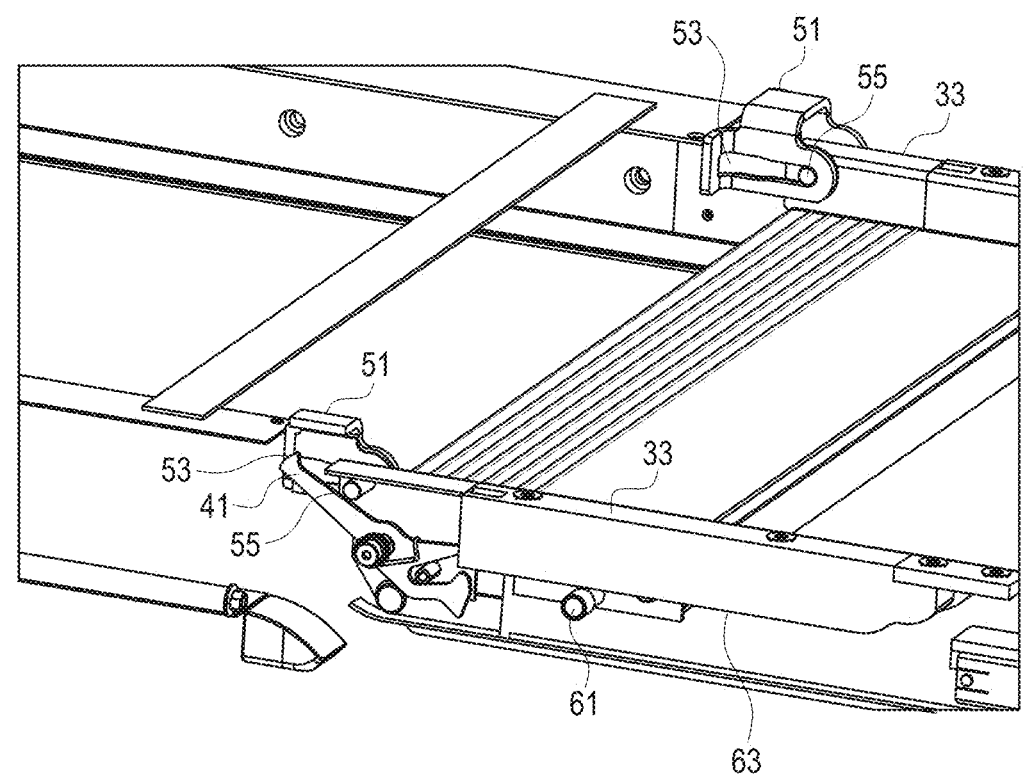
FIG. 12 is a partial, perspective view of the lock-out latch translated into a locked position with the slide module moved aft.
Figure 13:
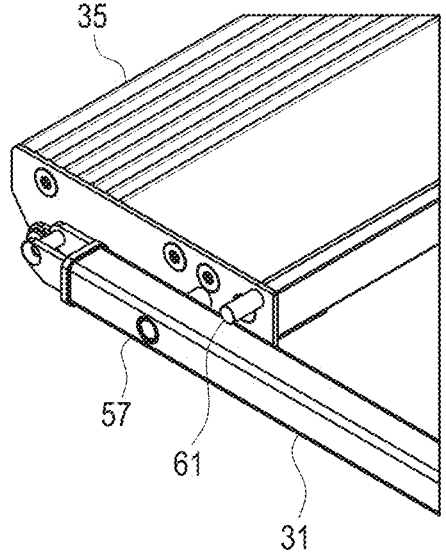
FIG. 13 is a partial, perspective view of the at least one additional step mounted to a slide arm.
Figure 14:
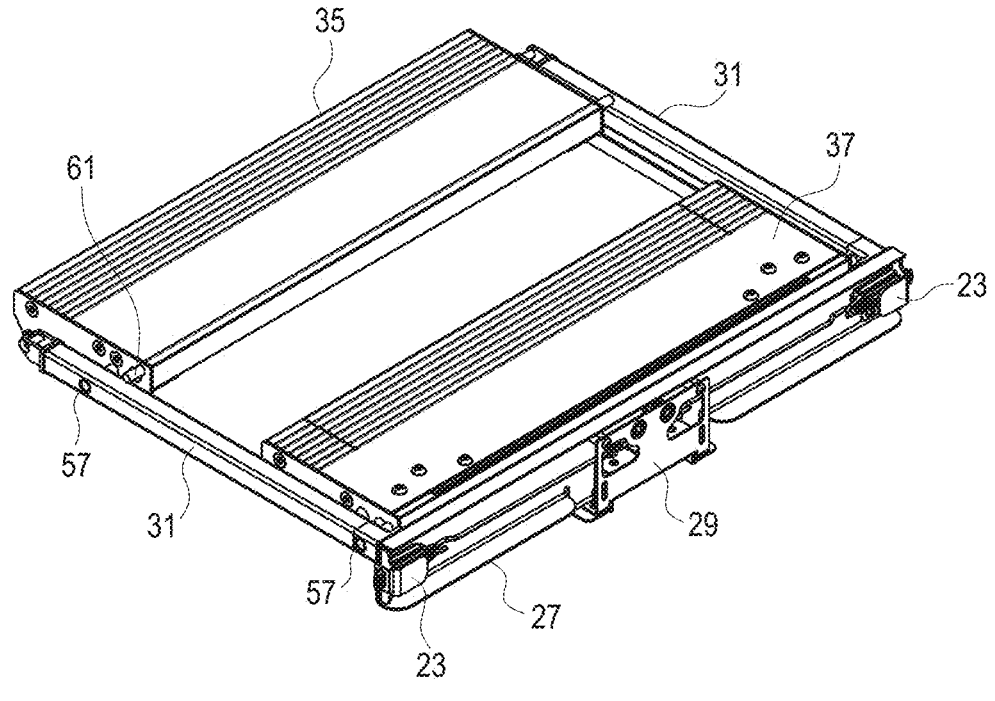
FIG. 14 is a partial, perspective view of the isolated step assembly with the steps parallel to the slide arms.
Figure 15:
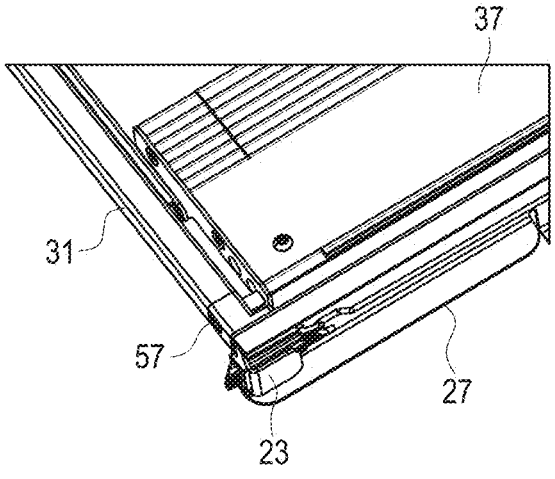
FIG. 15 is a partial, perspective view of the first step in the step assembly.
Figure 16:
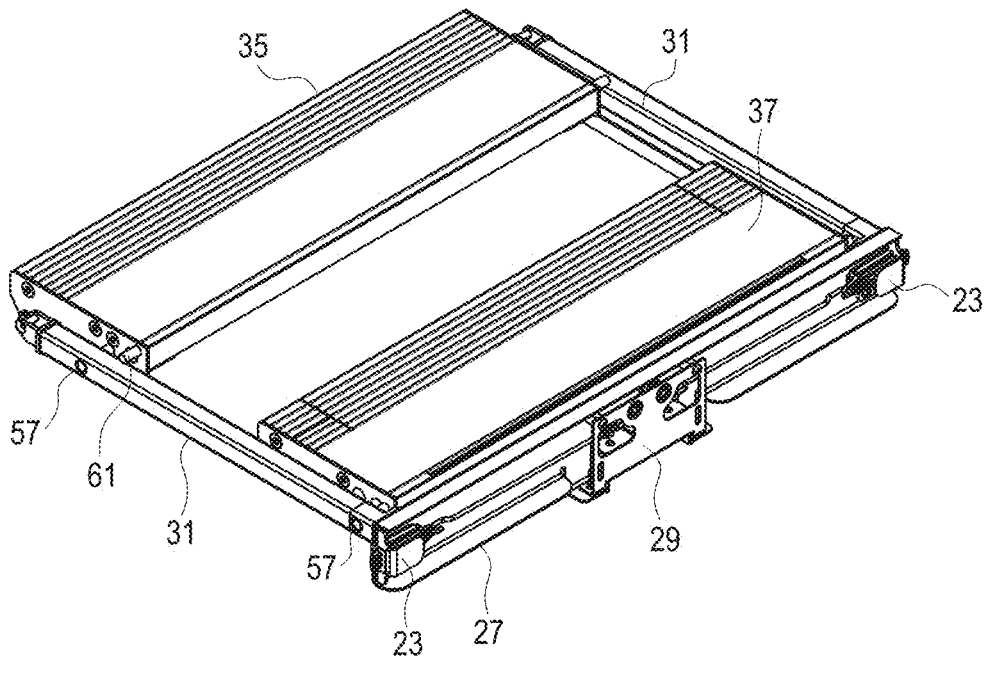
FIG. 16 is a perspective view of the isolated step assembly with the steps parallel to the slide arms.
Figure 17:
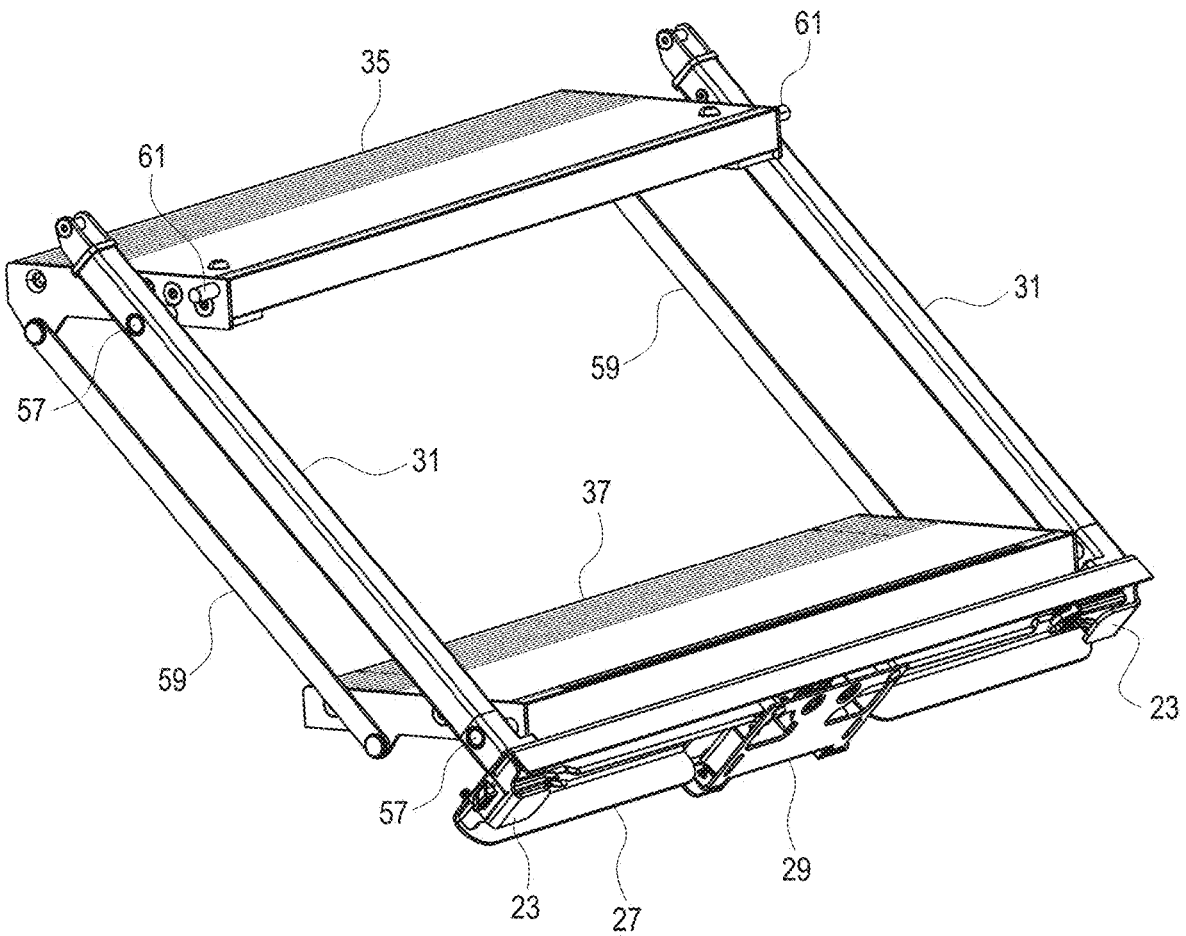
FIG. 17 is a perspective view of the isolated step assembly with the steps deployed for use.
Figure 18:
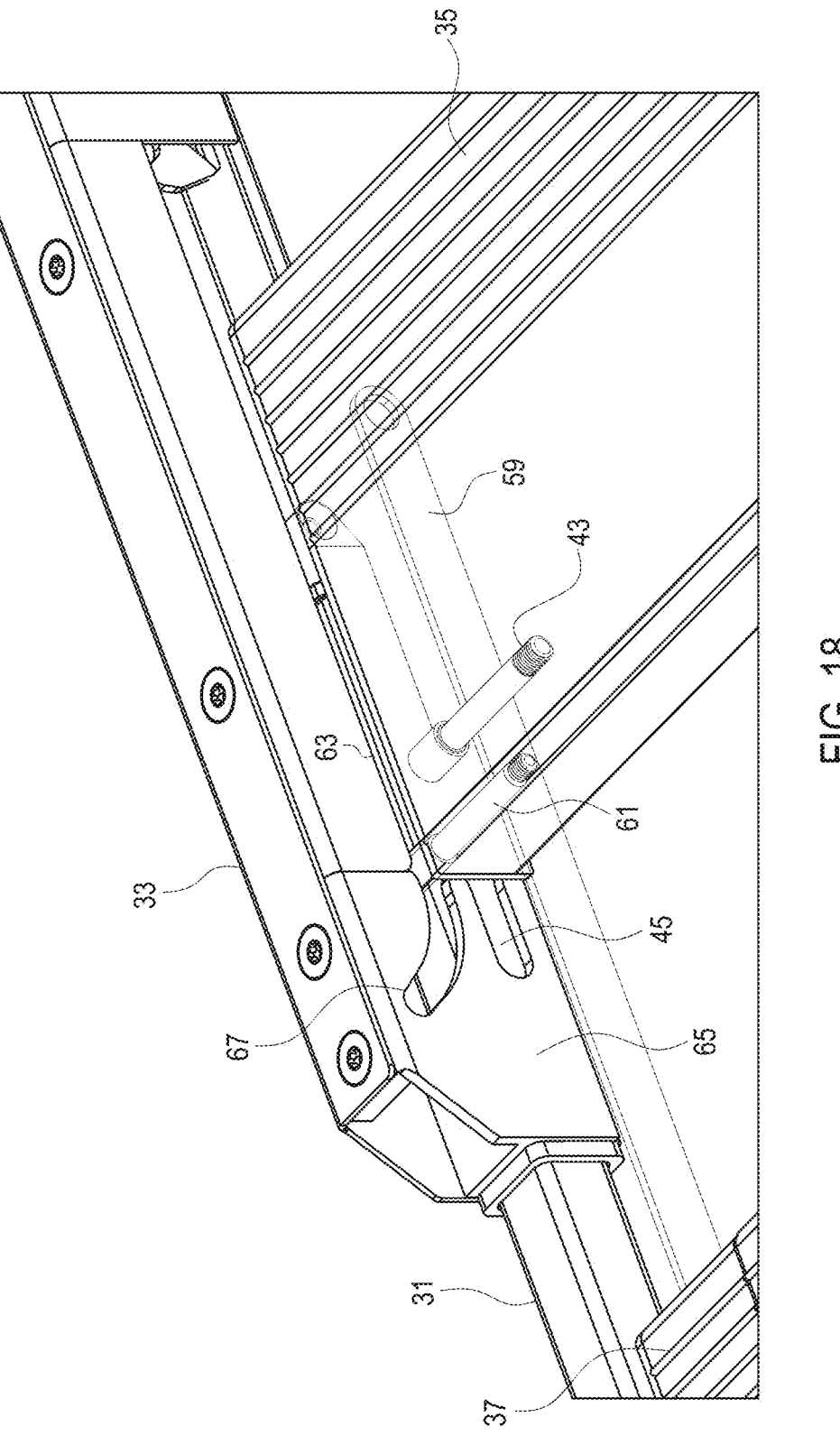
FIG. 18 is a perspective, partially see-through view of a lock-out slot, guide slot, lock-out pin, and guide pin.
Figure 19:
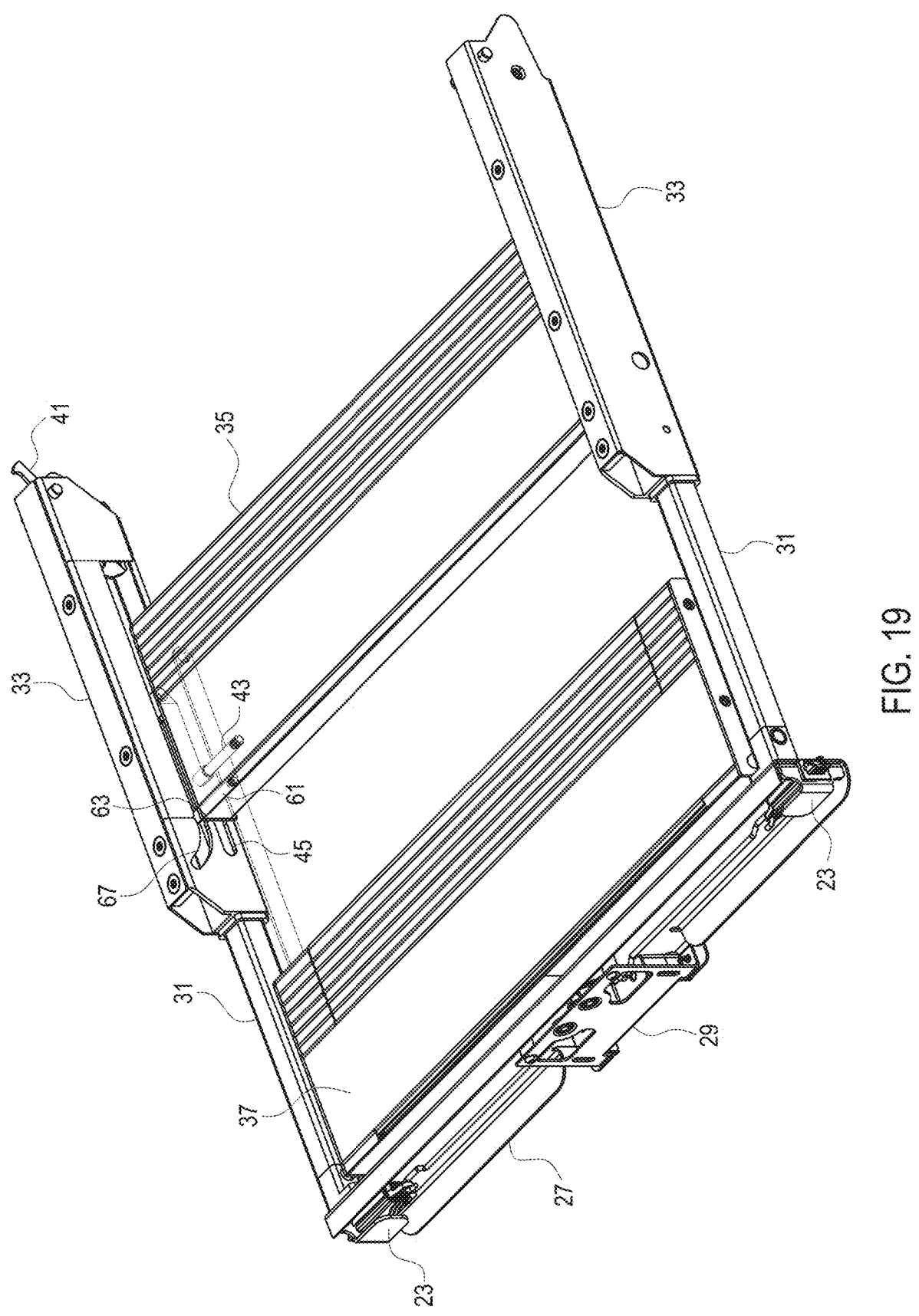
FIG. 19 is a perspective view of the slide module of the stowable step assembly system with the slide arms partially extended.
Figure 20:
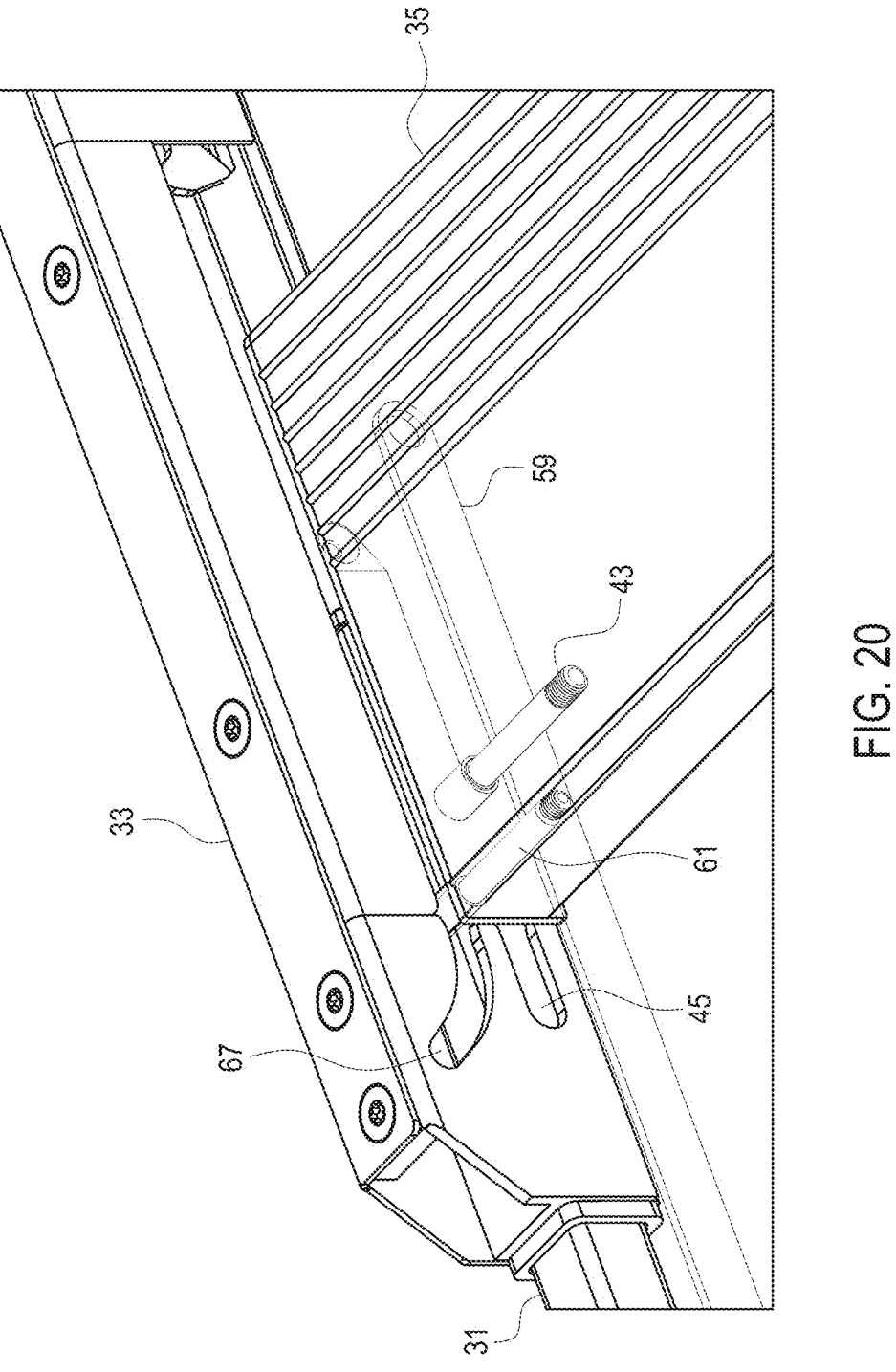
FIG. 20 is a partial, perspective, partly see-though view of the slide module with a guide pin about to enter a guide slot.
Figure 21:
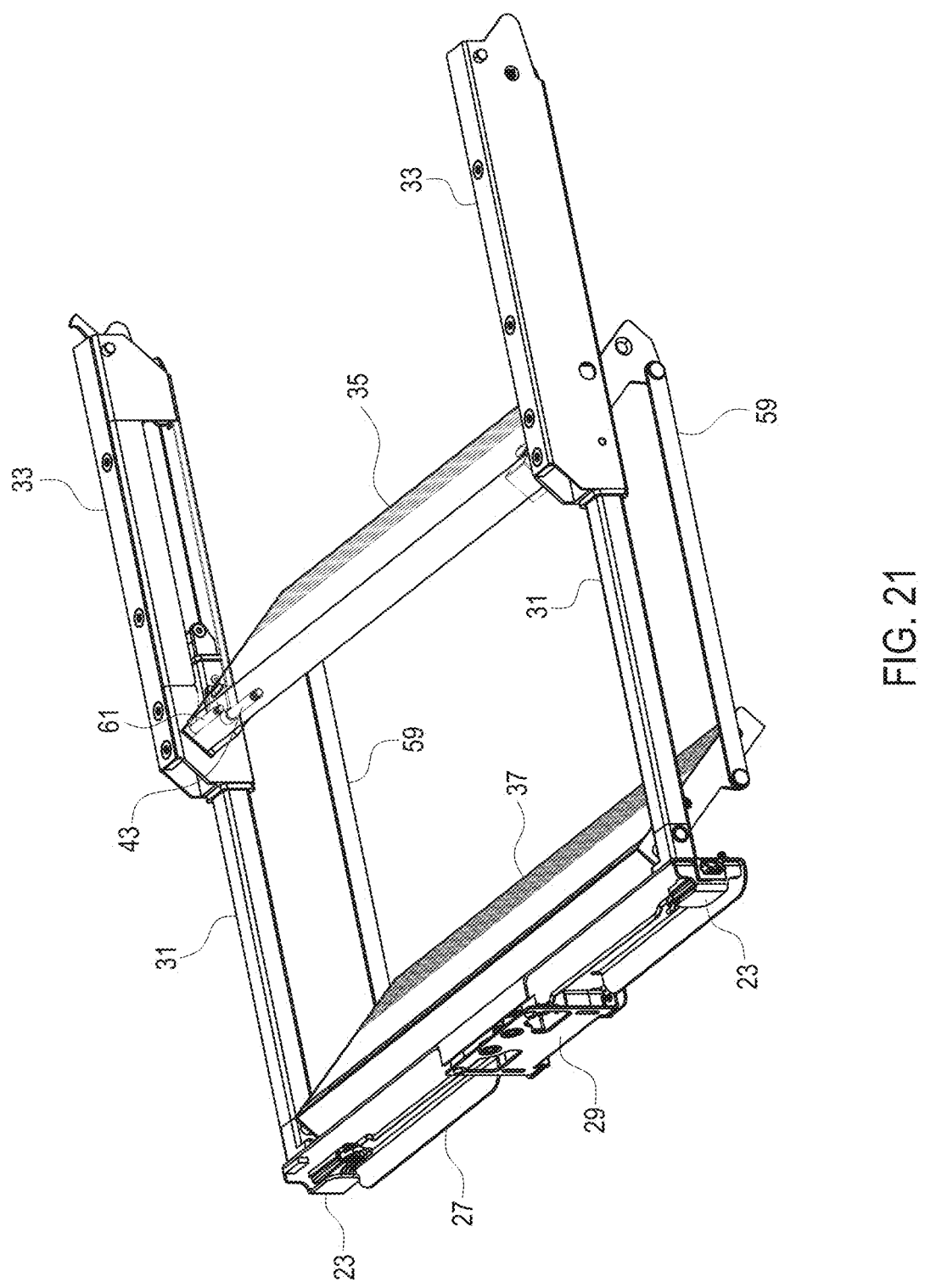
FIG. 21 is a perspective view of the isolated slide module with the steps partially deployed.
Figure 22:
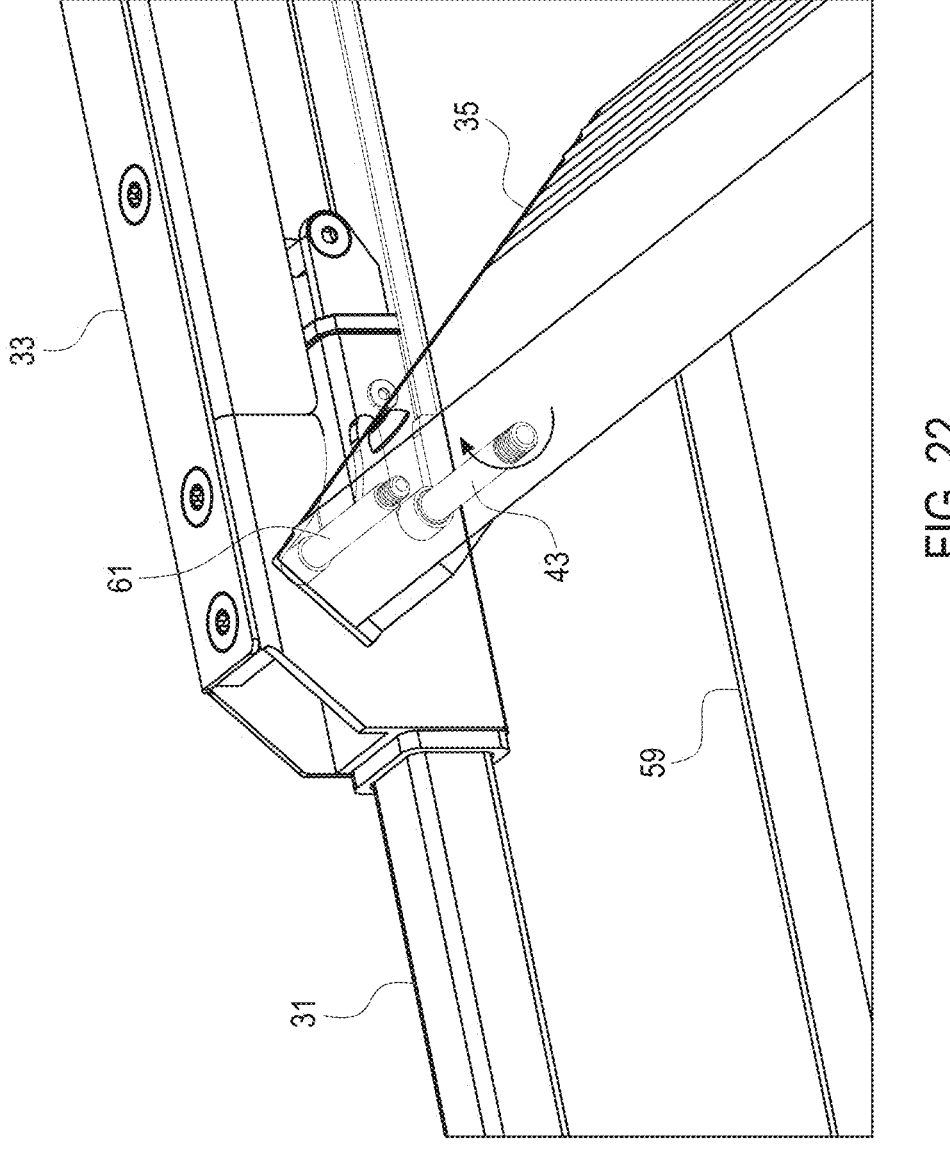
FIG. 22 is a partial, perspective, partly see-though view of the slide module with a guide pin fully positioned in a guide slot.
Figure 23:
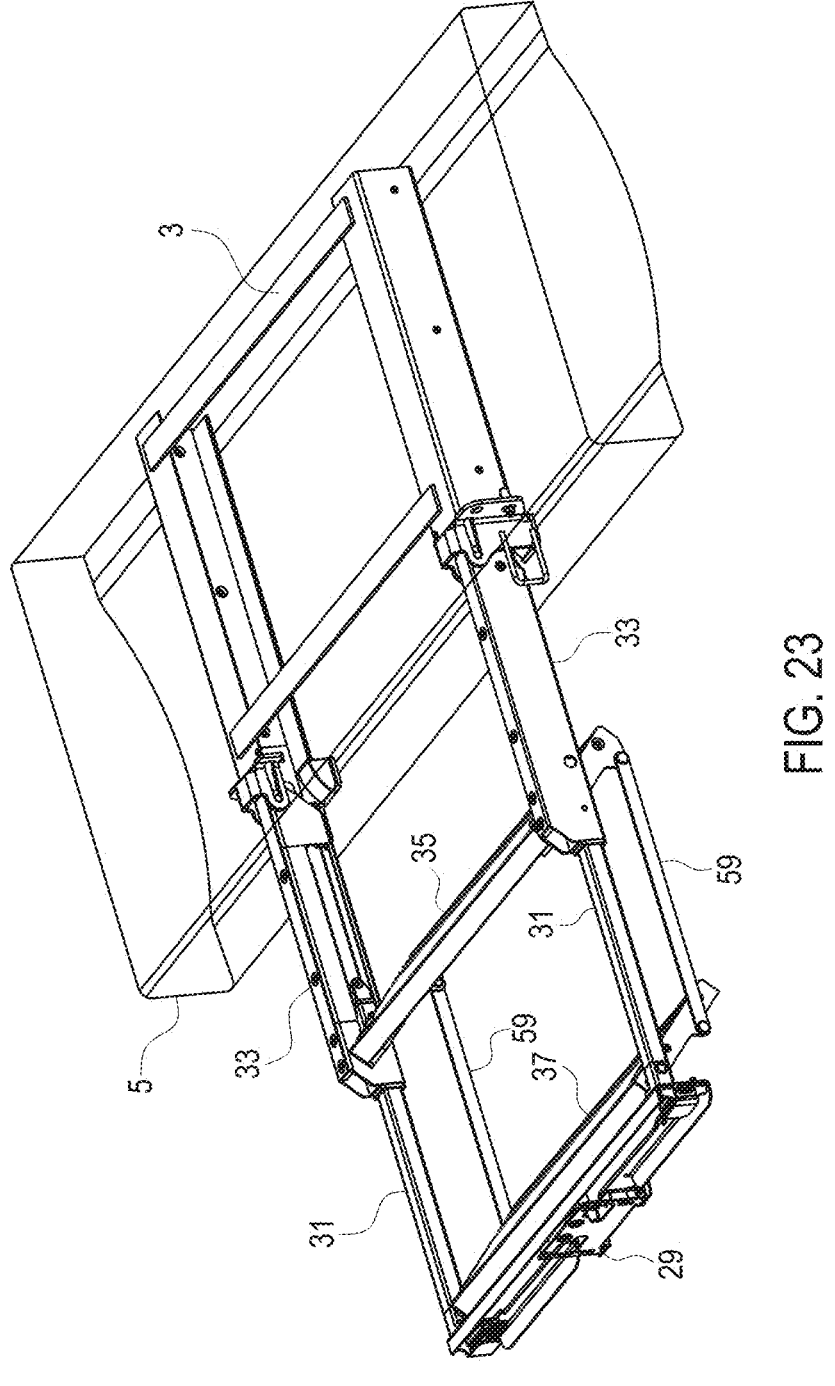
FIG. 23 is a perspective view of the stowable step assembly system mounted in a schematically illustrated tailgate with the steps partially deployed.
Figure 24:
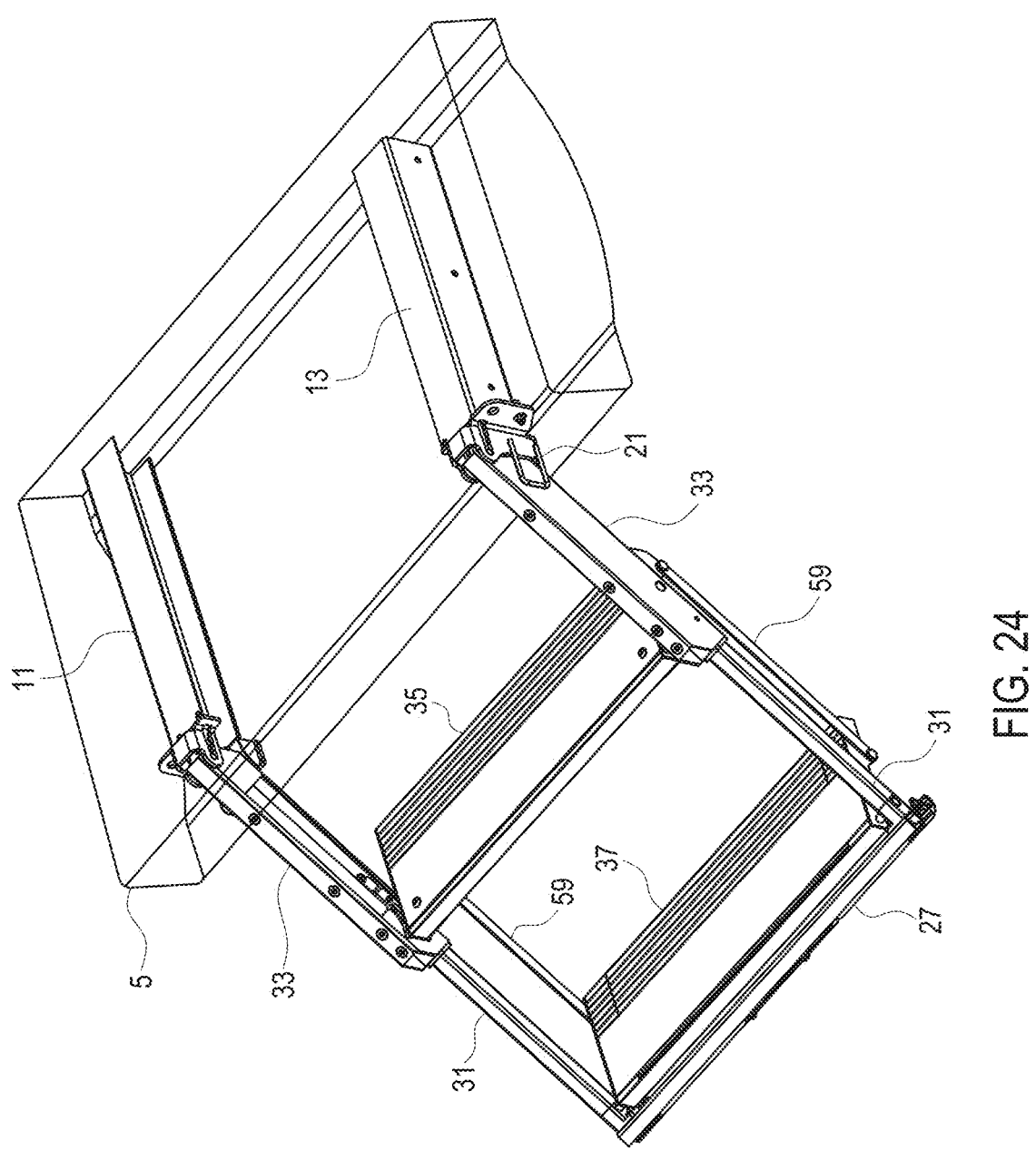
FIG. 24 is a perspective view of the stowable step assembly system mounted in a schematically illustrated tailgate with the steps fully deployed.
Figure 25:
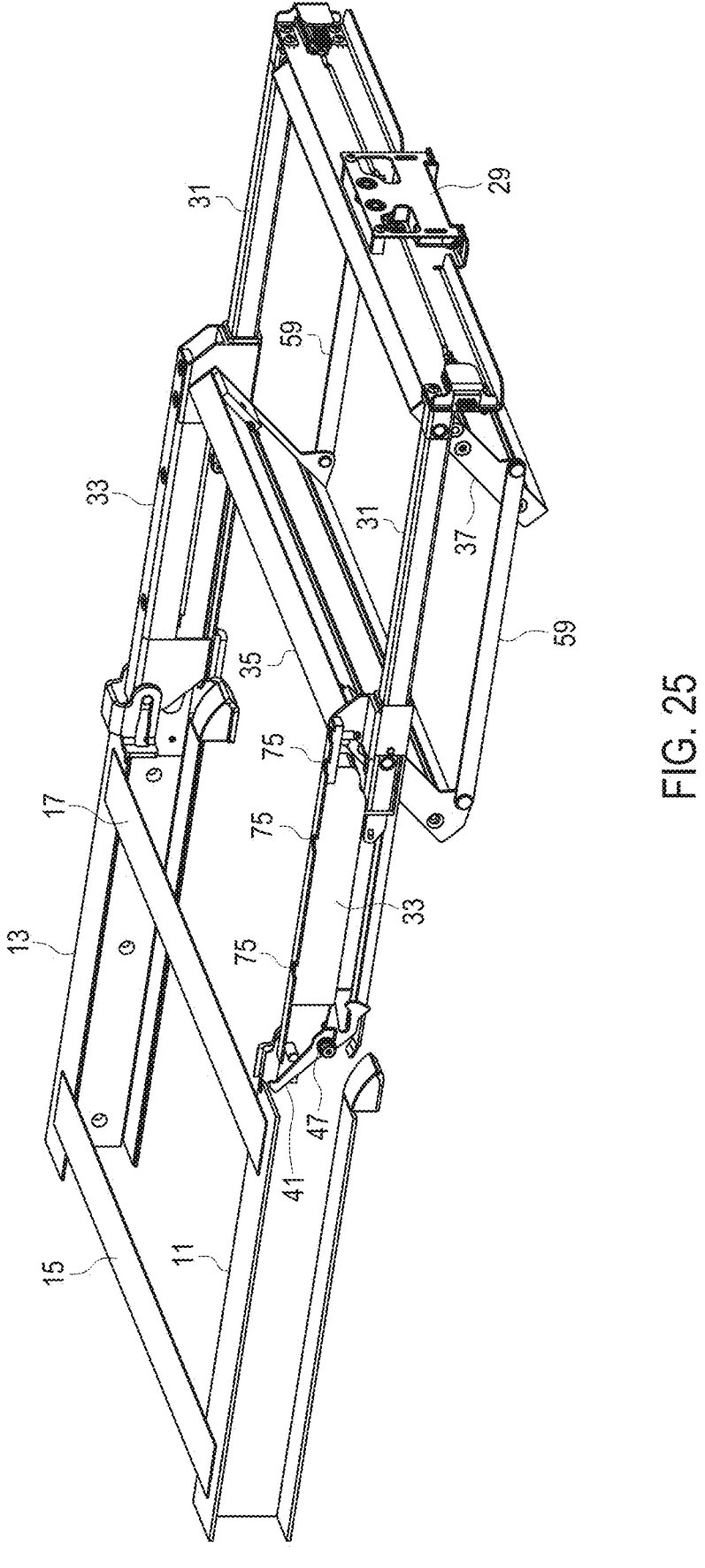
FIG. 25 is a perspective view of the isolated step assembly with the steps partially deployed as the step assembly is returned to parallel with the carrier arms.
Figure 26:
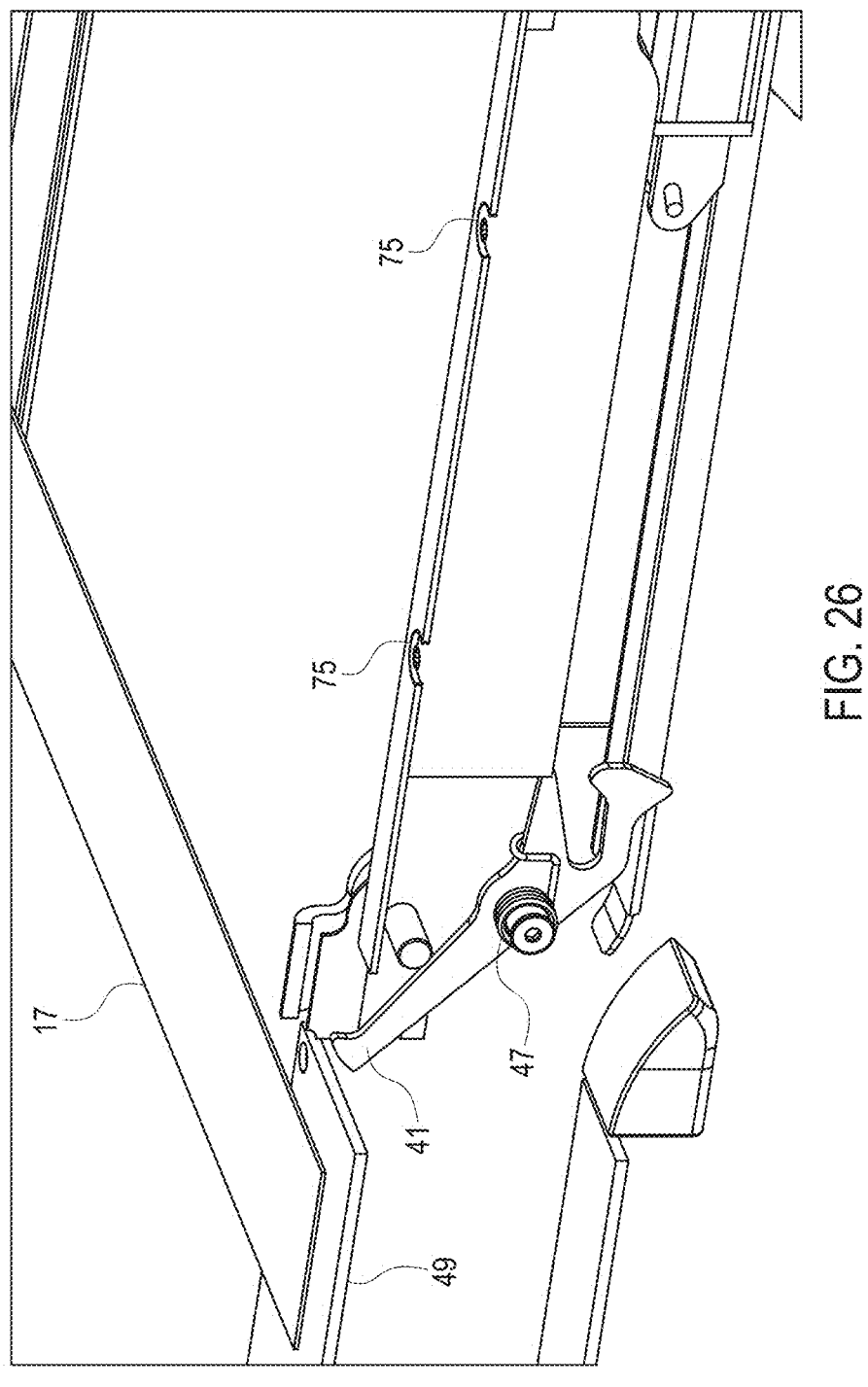
FIG. 26 is a partial, perspective view of an alternative latching system showing a guide arm, a frame arm, a spring-loaded pawl and locking slots.
Figure 27:
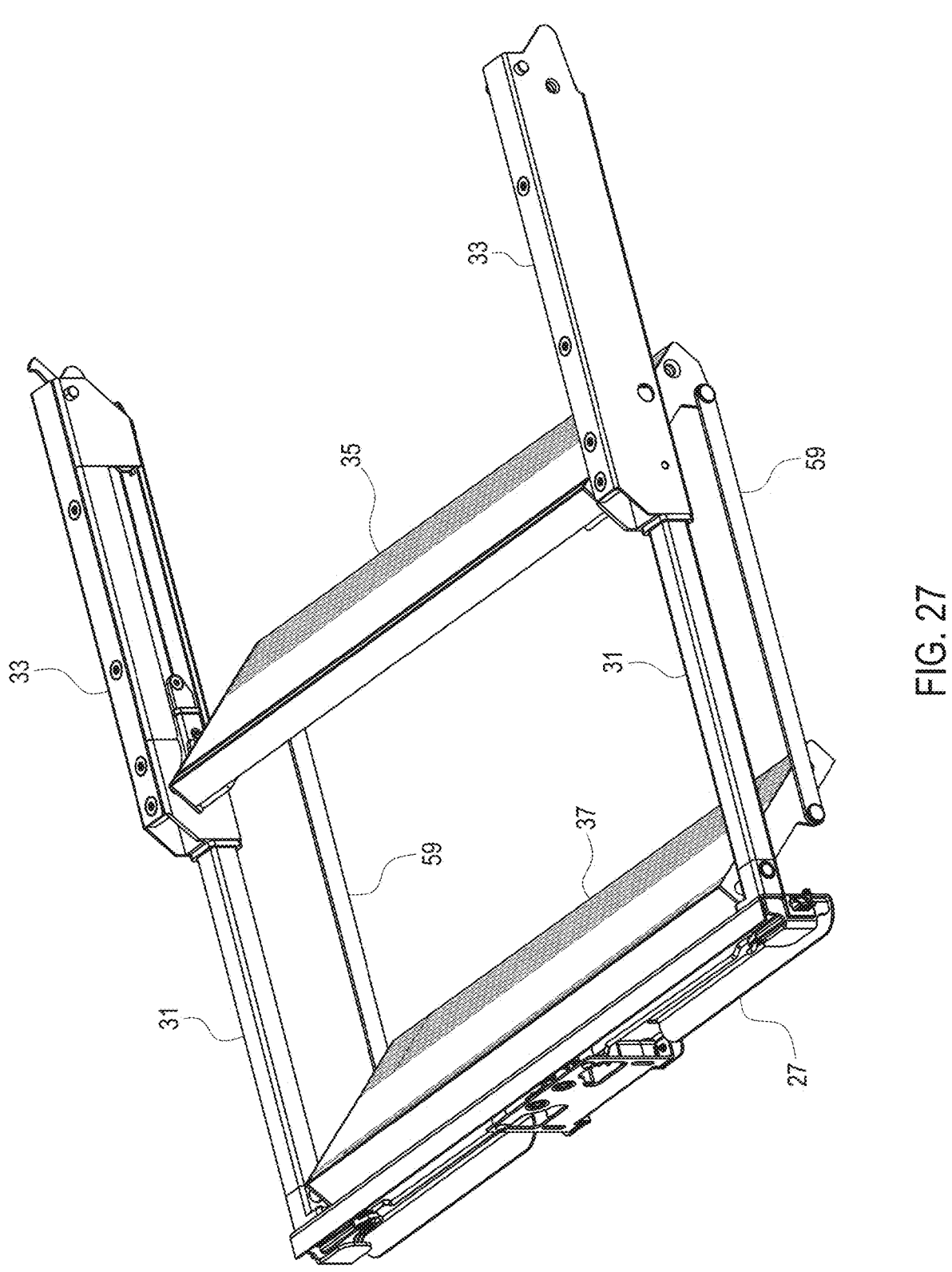
FIG. 27 is a perspective view of the isolated slide module with the steps partially deployed with the alternative latching system.
Figure 28:
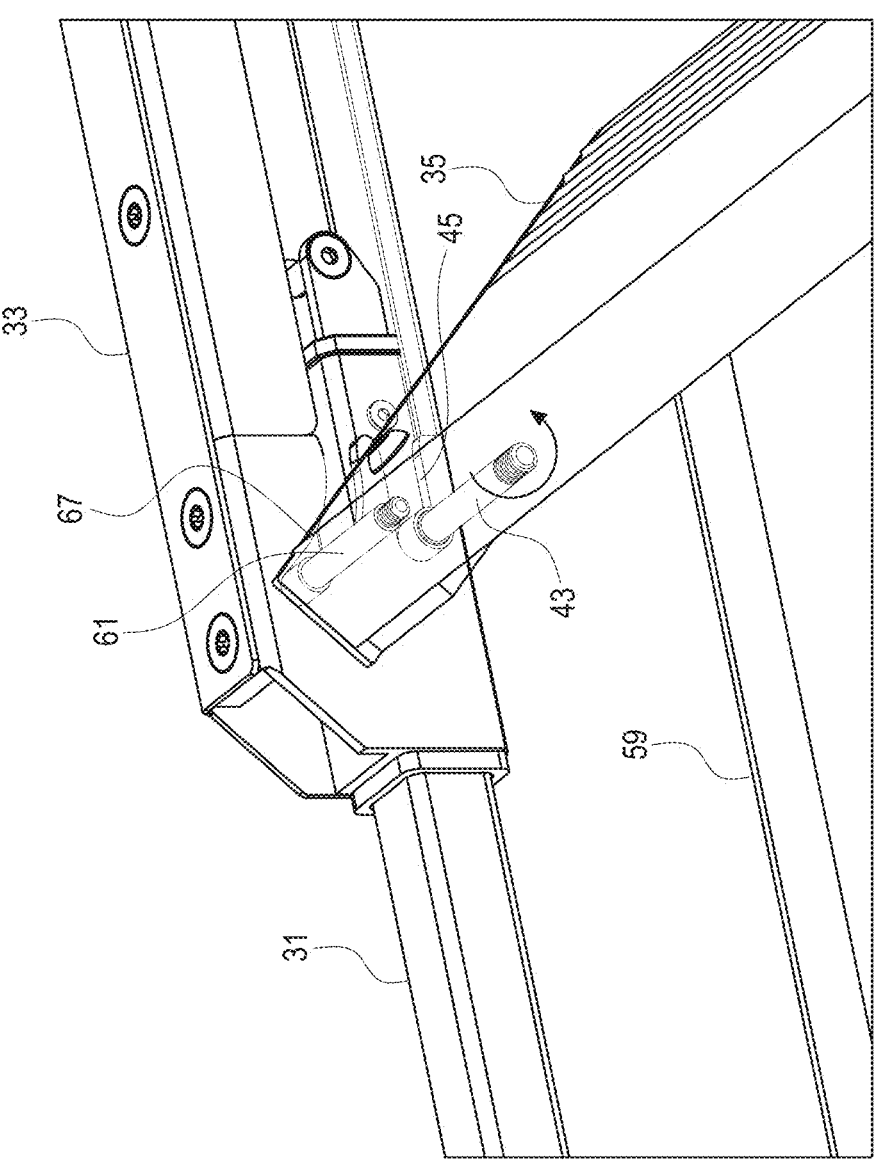
FIG. 28 is a partial, perspective, partly see-though view of the slide module with a guide pin fully positioned in a guide slot with the alternative latching system.
Figure 29:
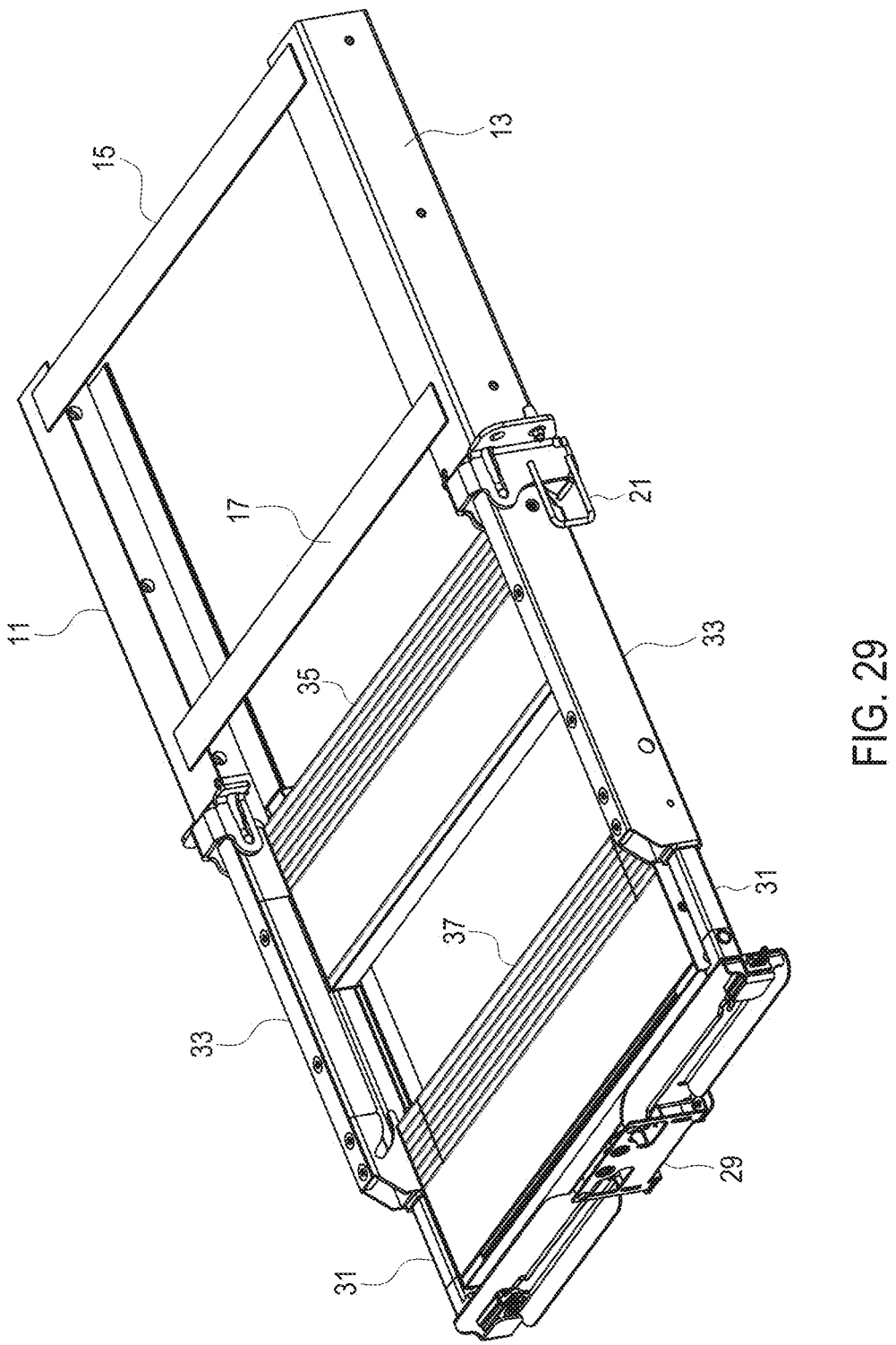
FIG. 29 is a perspective view of the isolated stowable step assembly system with the carrier arms extended and the step assembly partially extended.
Figure 30:
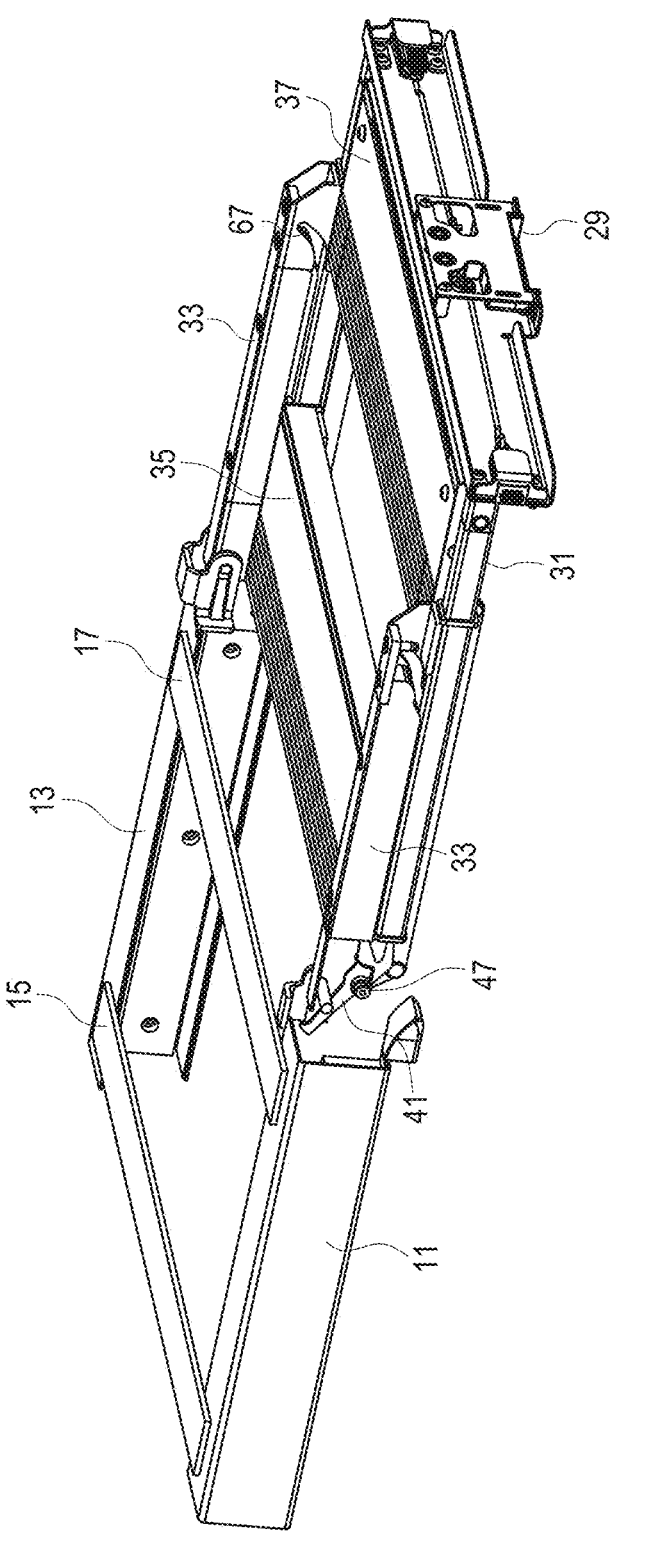
FIG. 30 is a further perspective view of the isolated stowable step assembly system with the carrier arms extended and the step assembly partially extended and showing the lock-out latch.
Figure 31:
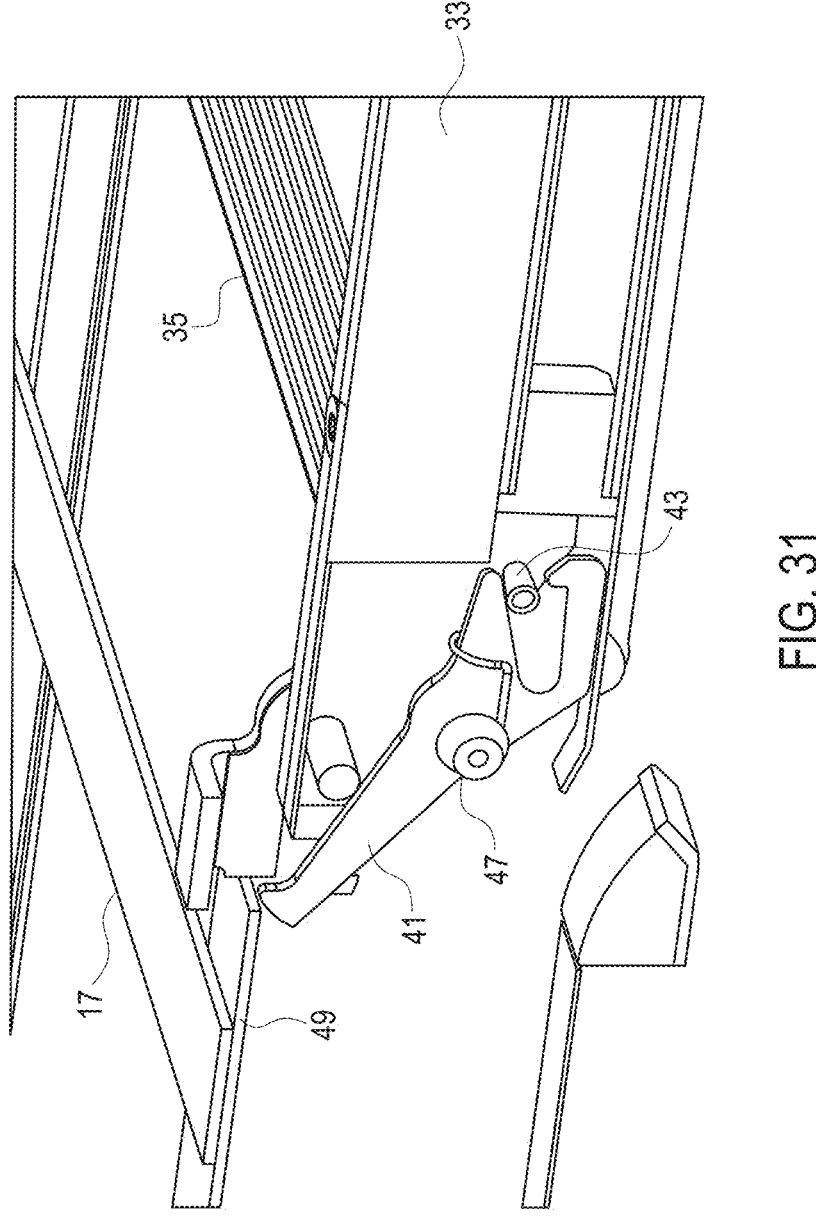
FIG. 31 is a partial, perspective view of the lock-out latch in contact with a lock-out pin and rotating out of the lock-out position.
Figure 32:
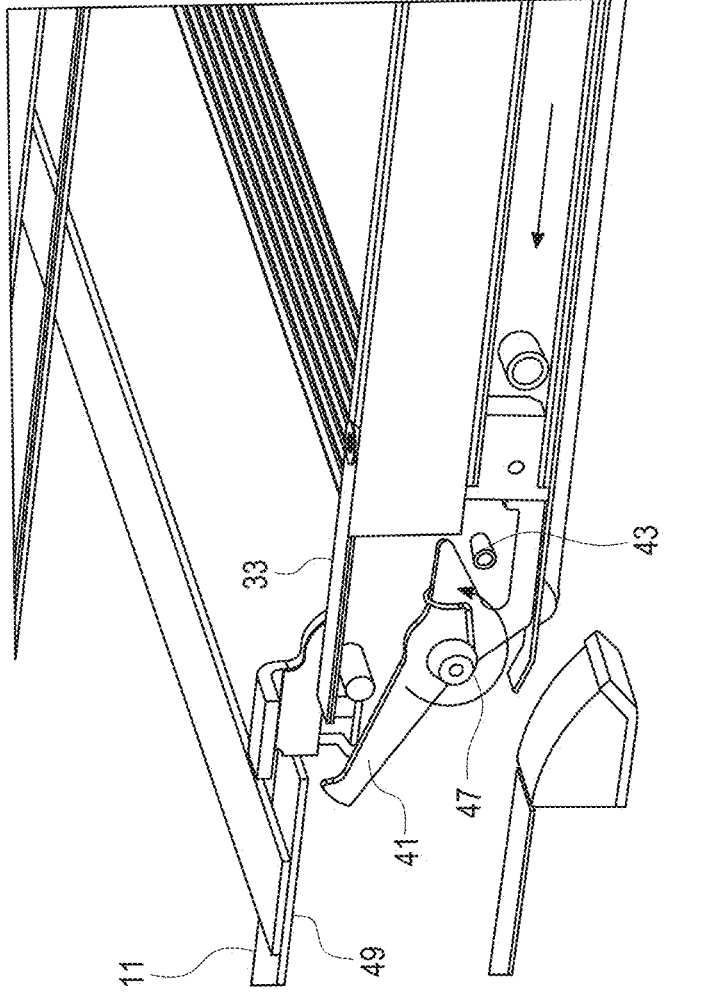
FIG. 32 is the view of FIG. 31 with the lock-out latch further rotated below the level of a longitudinal contact surface of a frame arm.
Figure 33:
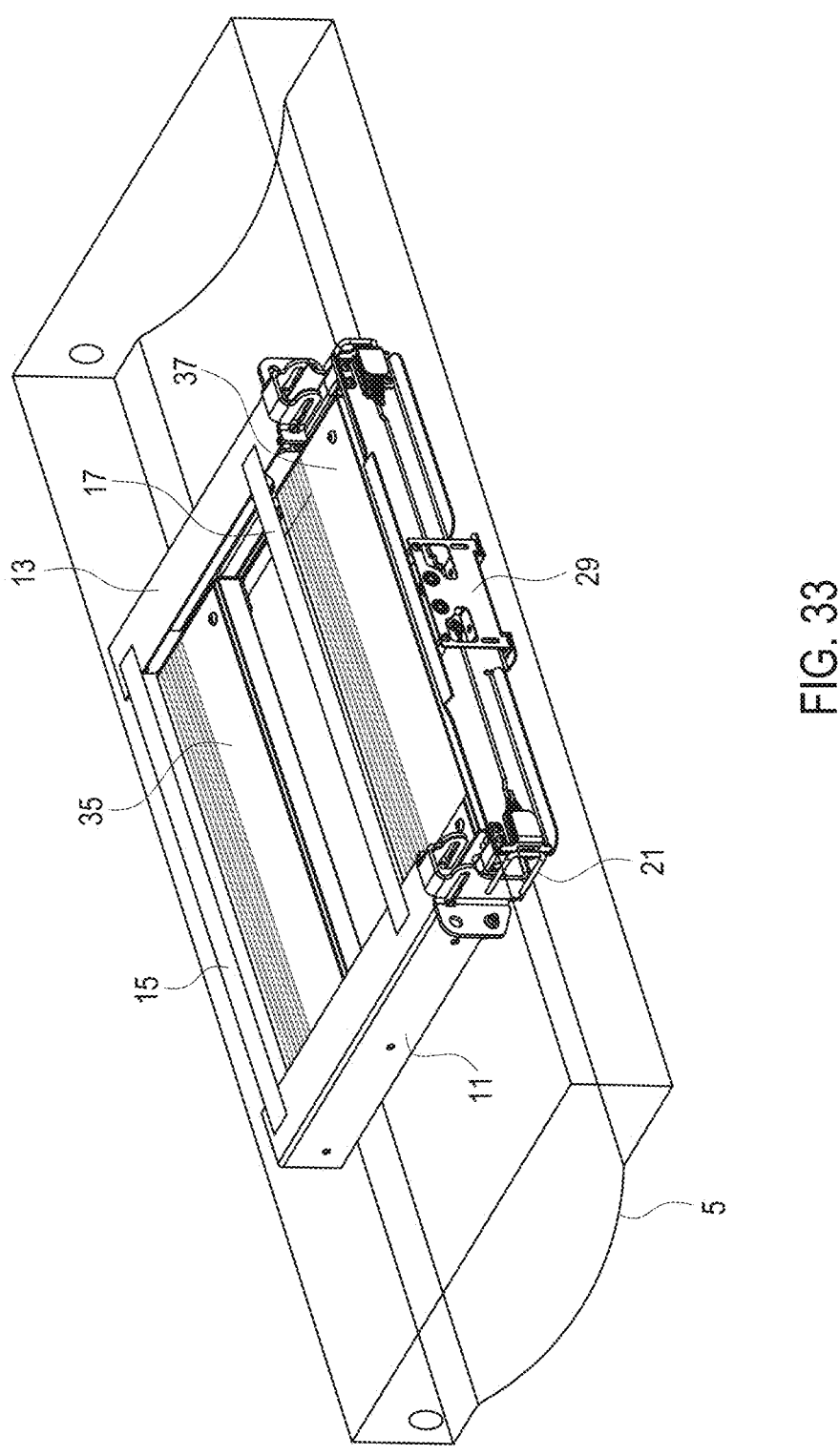
FIG. 33 is a perspective view of the stowable step assembly system mounted in a schematically illustrated tailgate with the step assembly fully stowed.
Figure 34:
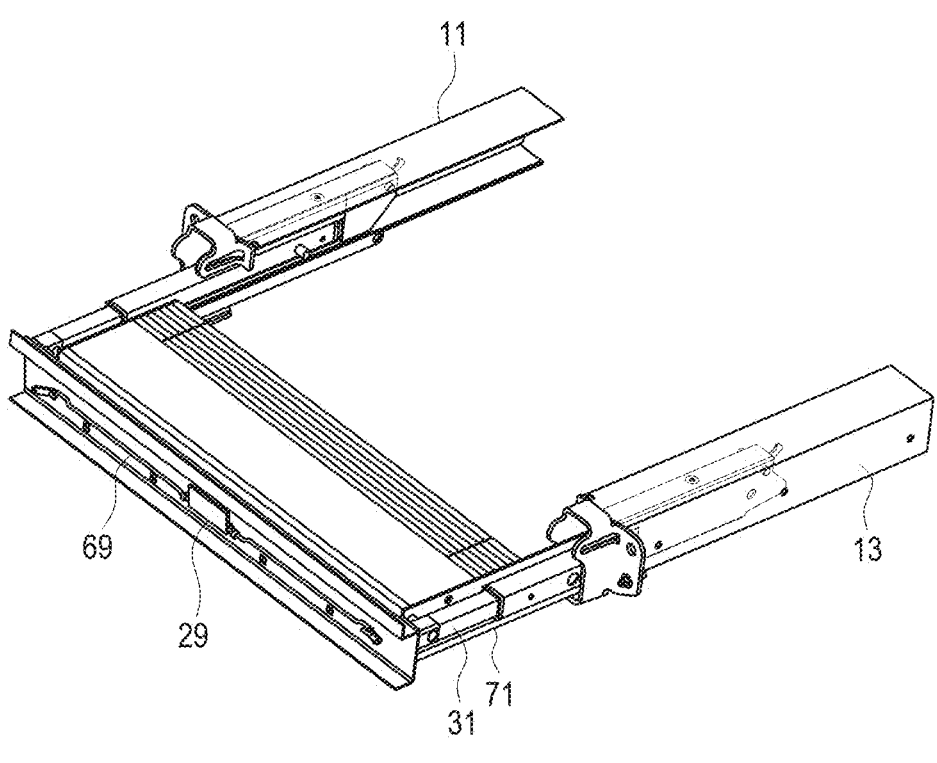
FIG. 34 is a perspective view of the isolated slide module with the step assembly partially extended and with the alternative latching system.
Figure 35:
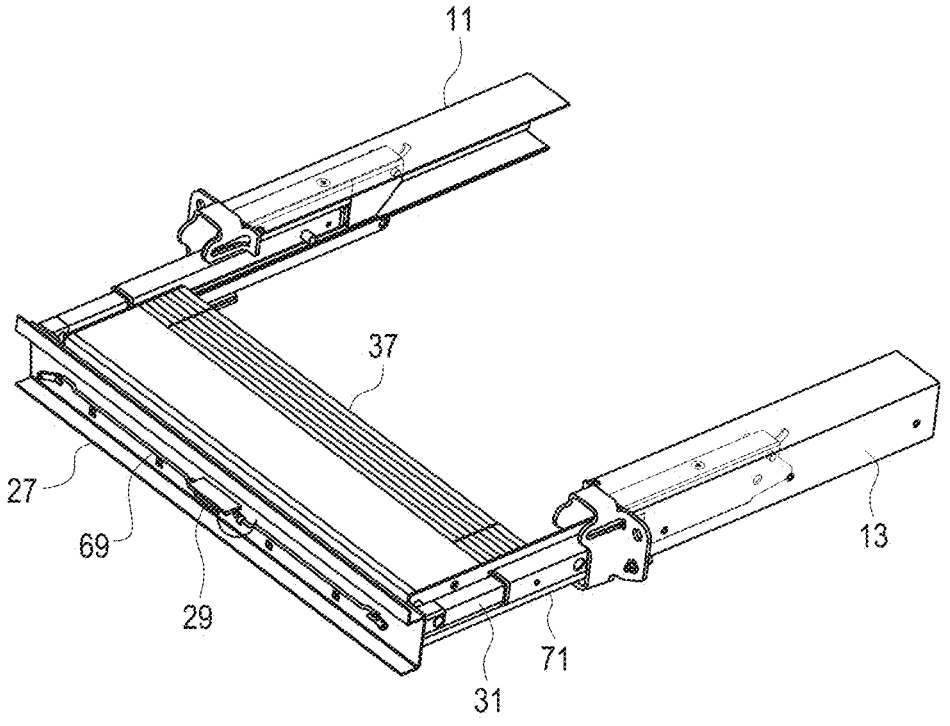
FIG. 35 is the view of FIG. 34 with a lateral arm rotated as part of the alternative latching system.
Figure 36:
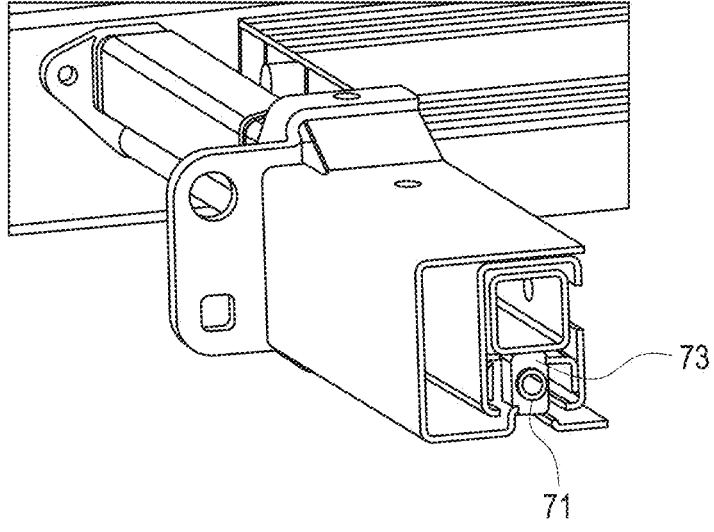
FIG. 36 is a perspective, cross sectional view showing the locking rod and pawl of the alternative latching system with the latch pawl locked.
Figure 37:
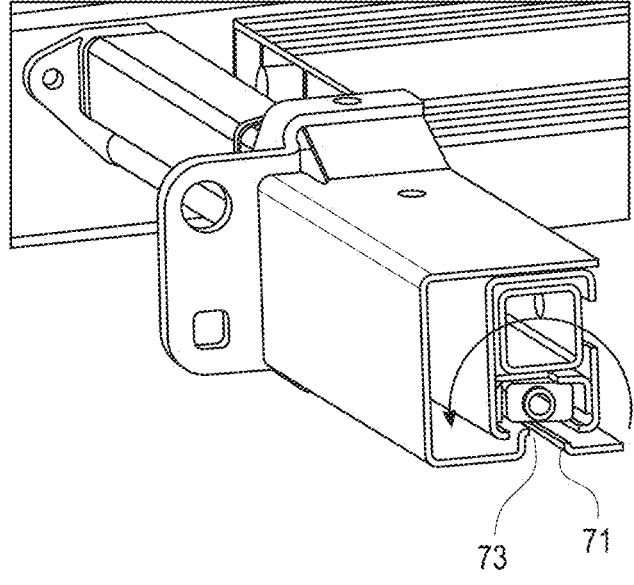
FIG. 37 is the view of FIG. 36 showing a direction of rotation of the locking rod and pawl with the latch pawl unlocked.
Figure 38A:
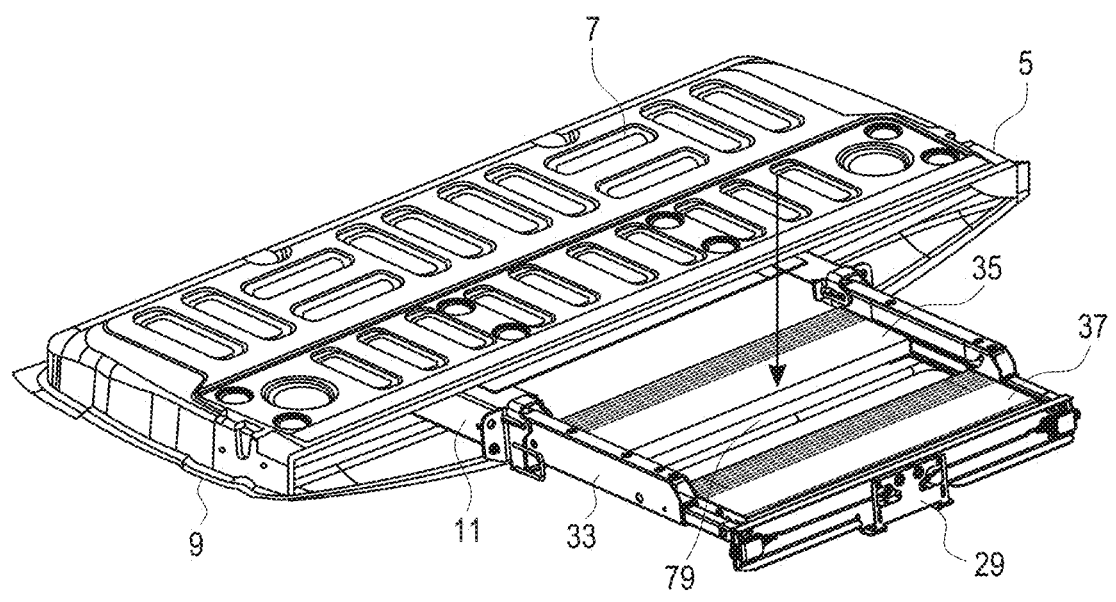
FIG. 38A is a perspective view of the stowable step assembly system mounted in a realistically illustrated tailgate and including a stowed load stop.
Figure 38B:
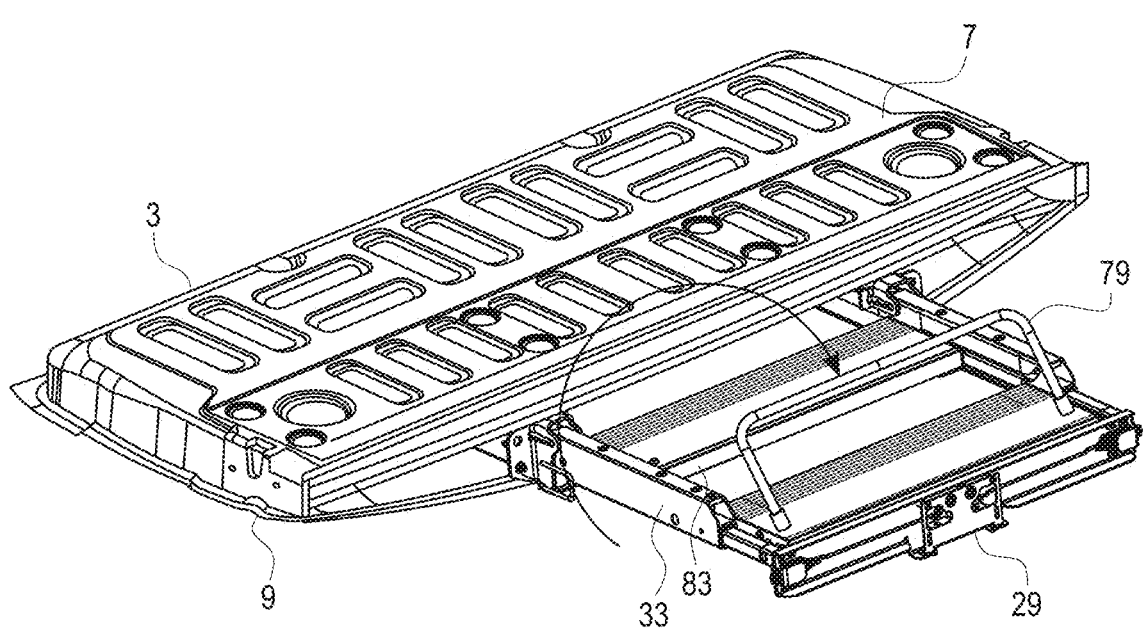
FIG. 38B is the view of FIG. 38A with a partially deployed load stop.
Figures 39A, 39B:
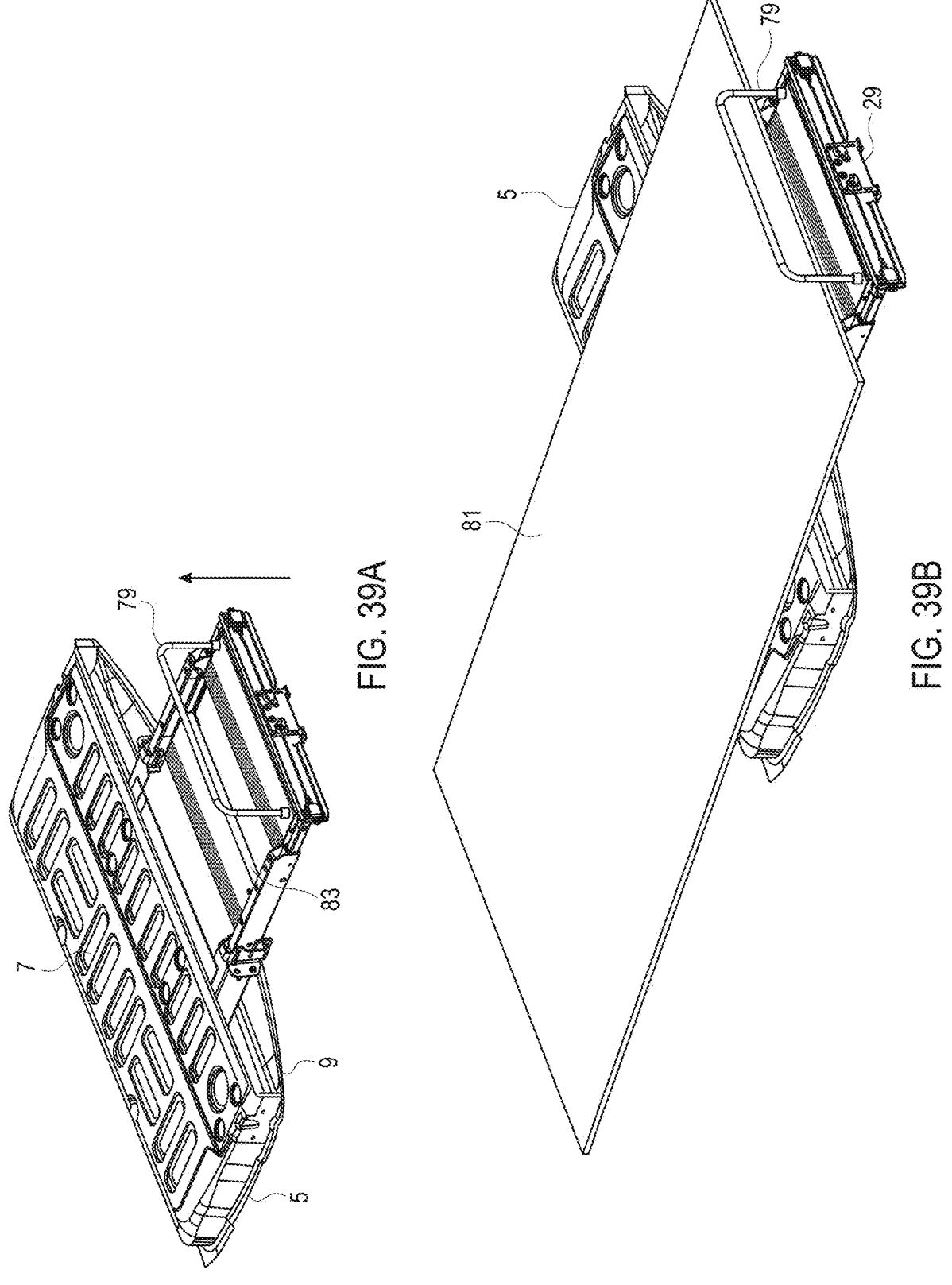
FIG. 39A is the view of FIG. 38A with a fully deployed load stop.
FIG. 39B is the view of FIG. 39A with the load stop blocking movement of cargo.

The stowable tailgate step assembly 1 of the invention is most favorably applied to a configuration with two steps, although a single step or more than two steps may be employed. Referring to FIGS. 1 to 7, a frame 3 is mounted within a vehicle tailgate 5. Since the tailgate may be conventionally mounted to a pick-up truck or other suitable vehicle, the truck is not illustrated. The tailgate 5 is illustrated schematically in FIGS. 1 and 6 and more realistically in FIGS. 38 and 39. The frame 3 sits between the front and rear facing surfaces, or inner and outer faces 7, 9, of the tailgate 5 as defined when the tailgate 5 is in a closed, upright position. The frame 3 is provided with two frame arms 11, 13 which are oriented top to bottom within the tailgate 5 when the tailgate 5 is closed. When the tailgate 5 is opened 90 degrees to parallel with a floor of a truck bed, the frame arms 11, 13 are oriented fore and aft of the vehicle. As described herein, the tailgate 5 is assumed to be parallel with the floor of the truck bed when the stowable tailgate step assembly 1 is in use. The frame arms 11, 13 are preferably connected by lateral connecting pieces 15, 17 to form a stable frame structure. In one embodiment, attached aft on the frame arms 11, 13 are brackets 19 with strikers 21 for assembly latches 23. In an alternative embodiment, the latching occurs in multiple positions without the use of a striker.

A slide module 25, which may also be referred to as a slide assembly, is releasably attached to the frame 3. The slide module 25 includes a rear cross-piece 27 which includes a latch release handle 29. In one embodiment, the movement of the latch release handle 29 from a resting position releases assembly latches 23 located at distal ends of the cross-piece 27. The assembly latches 23 releasably engage with the strikers 21 on the frame arms 11, 13. In another embodiment, multiple latching positions, including latching of the cross-piece 27 to the frame 3, are provided as further described and illustrated herein.

The cross-piece 27 is connected to two slide arms 31, which may be tubular, adjacent the distal ends of the cross-piece 27. The slide arms 31 translate in relation to two carrier arms 33, which may also be referred to as guide arms, which are also oriented fore and aft. Two steps, a first step 35 and at least one additional step 37, the second step in this configuration, are pivotally mounted between the slide arms 31. Either step, however, may be designated as a first step. Although two steps are preferred, other numbers of steps, such as three or four, may be employed. The cross-piece 27, slide arms 31 and steps 35, 37 comprise a step assembly 39. The step assembly 39 and carrier arms 33 comprise the slide module 25. The slide module 25 translates in relation to the frame arms 11, 13. When the assembly latches 23, or alternative latches, are released using the latch release handle 29, the slide module 25 may be pulled horizontally out from the frame 3. This action allows the steps 35, 37 to be deployed with the step assembly 39 at an angle between the carrier arms 33, parallel to the truck bed, and the ground. Lifting and pushing the cross-piece 27, using the latch release handle 29 or otherwise, returns the step assembly 39 to horizontal and back inboard towards the truck cargo bed until the slide module 25 is again latched to the frame 3. With the slide module 25 stowed, essentially only the cross-piece 27 is exposed.

The step assembly 39 also translates in relation to the carrier arms 33. Referring to FIGS. 8 to 12, at least one lock-out latch 41 prevents the step assembly 39 from translating in relation to the carrier arms 33 until the slide module 25 is pulled aft in relation to the frame arms 11, 13 and free of the restraint provided by the frame arms 11, 13. This comprises moving the step assembly 39 from a stowed position to an extended position. Preferably, a lock-out latch 41 is provided on each lateral side of the slide module 25, although a single lock-out latch 41 may be employed. The lock-out latches 41 ensure that the steps 35, 37 do not deploy prematurely. The lock-out latches 41 are pivotally mounted to the carrier arms 33 and spring loaded. Lock-out pins 43 mounted adjacent the fore ends of the carrier arms 33 are engaged by an aft portion of the lock-out latch 41 when the slide module 25 is stowed and while the slide module 25 is being extended rearwardly to a limit. Preferably, the lock-out pins 43 are releasably restrained by lock-out latch slots 45 in the lock-out latch 41. A single lock-out pin 43 is used when a single lock-out latch 41 is employed. The fore ends of the lock-out latches 41 slidingly contact the frame arms 11, 13 when the slide module 25 is stowed and while the slide module 25 is being extended rearwardly to the extended position. This contact keeps the lock-out latch spring 47 of the lock-out latch 41 biased and the lock-out pins 43 engaged by the aft portion of the lock-out latch 41 during rearward extension of the slide module 25.

When the slide module 25 is fully extended rearwardly to a limit, the fore ends of the lock-out latches 41 pass by the aft ends of the frame arms 11, 13 and no longer contact a longitudinal contact surface 49 of the frame arms 11, 13, thus allowing rotation of the lock-out latches 41 under the lock-out latch spring 47 bias. Rotation of the lock-out latches 41 releases the lock-out pins 43 from the lock-out latch slots 45 in the lock-out latches 41. As illustrated, this rotation may be clockwise. With the lock-out pins 43 so released, the step assembly 39 is free to translate rearwardly in relation to the carrier arms 33. The fore ends of the rotated lock-out latches 41 now lie rearward of the frame arms 11, 13. Motion of the slide module 25 forward from this position causes the fore ends of the rotated lock-out latches 41 to contact aft ends of the frame arms 11, 13. This contact of the rotated lock-out latches 41 with the aft ends of the frame arms 11, 13 prevents the carrier arms 33 from sliding in relation to the frame arms 11, 13 until the lock-out pins 43 on the step assembly 39 again enter the lock-out latch slots 45 in the aft portion of the lock-out latches 41. This again biases the lock-out latch springs 47 which rotate the fore ends of the lock-out latches 41. This rotation drops the fore ends of the lock-out latches 41 below the top of the frame arms 11, 13. As illustrated, this rotation may be counter-clockwise. The fore ends of the lock-out latches 41 then again slidingly contact the frame arms 11, 13 as the slide module 25 moves towards a stowed position.

The aft ends of the frame arms 11, 13 are provided with pivot brackets 51. The pivot brackets 51 include pivot bracket slots 53 which engage with bracket pins 55 mounted to the fore ends of the carrier arms 33. These bracket pins 55 and pivot bracket slots 53 prevent the carrier arms 33 from translating further rearward as the step assembly 39 is deployed.

Referring to FIGS. 13 to 33, the steps 35, 37 are pivotally connected to the slide arms 31 with pivot pins 57. The steps 35, 37 are coplanar with the slide arms 31 prior to deployment but rotate in relation to the slide arms 31 to be essentially parallel with the truck bed, and the ground, when deployed. The steps 35, 37 are pivotally connected to each other by link rods 59. Preferably, a link rod 59 is provided at either lateral side of each step 35, 37. These link rods 59 ensure that the steps 35, 37 always rotate synchronously and in parallel.

Control means are also provided. Guide pins 61 are mounted at the lateral sides of at least one of the steps 35, 37, typically the first step 35, which will be described below. These guide pins 61 contact motion control surfaces 63 on the carrier arms 33 which maintain the steps 35, 37 in a coplanar relationship with the slide arms 31 while the step assembly 39 is being extended for deployment. At the aft ends of the carrier arms 33 are guide brackets 65 including guide slots 67 into which the guide pins 61 enter to permit deployment. The guide slots 67 are shaped which imposes a rotation of the first step 35 onto which the guide pins 61 are mounted. The shaping typically includes an arc to facilitate rotation. The additional, or second, step 37 is forced to rotate in the same manner as the first step 35 owing to the link rods 59 connecting the steps 35, 37. An array with more than two steps so connected functions similarly.

When the step assembly 39 is fully extended, it can be pivoted downwardly into the deployed position with the steps 35, 37 oriented for use. When the step assembly 39 is rotated back to parallel with the tailgate 5, the guide pins 61 move correspondingly in the guide slots 67 which returns the steps 35, 37 to parallel with the truck bed and coplanar with the slide arms 31.

Figure 40:
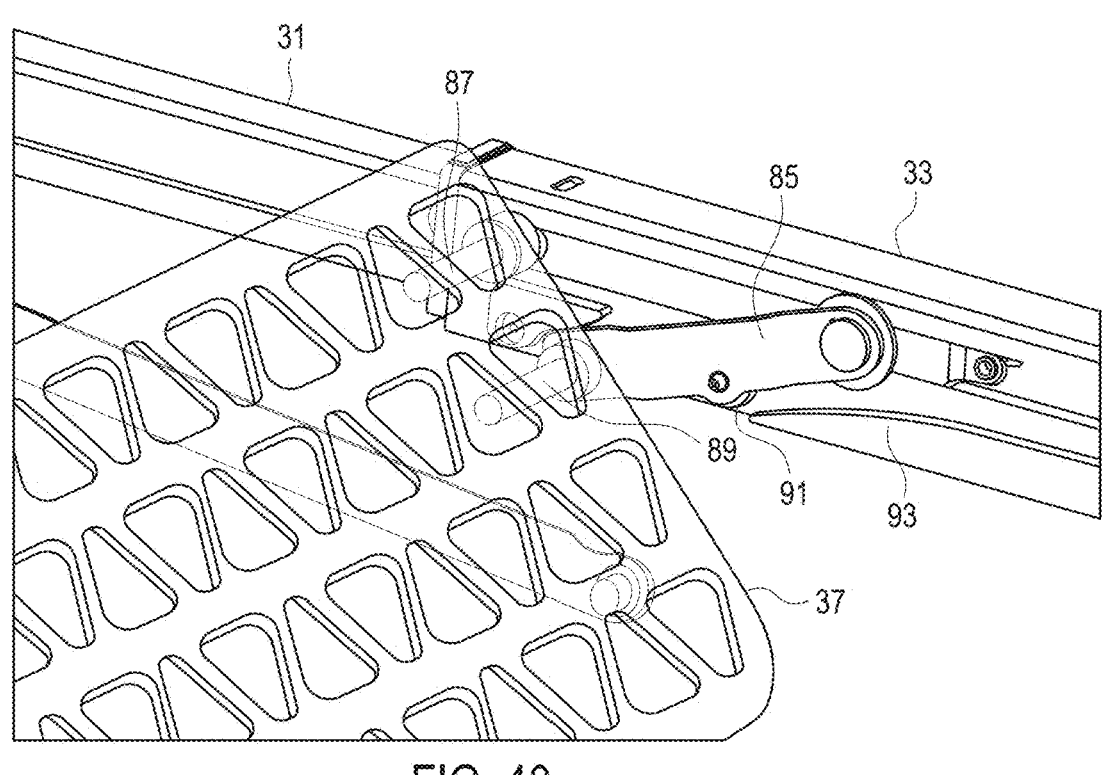
FIG. 40 is a perspective, partly see-through, partial view of alternative control means with a roller and ramp and a step rotated partly open.
Figure 41:
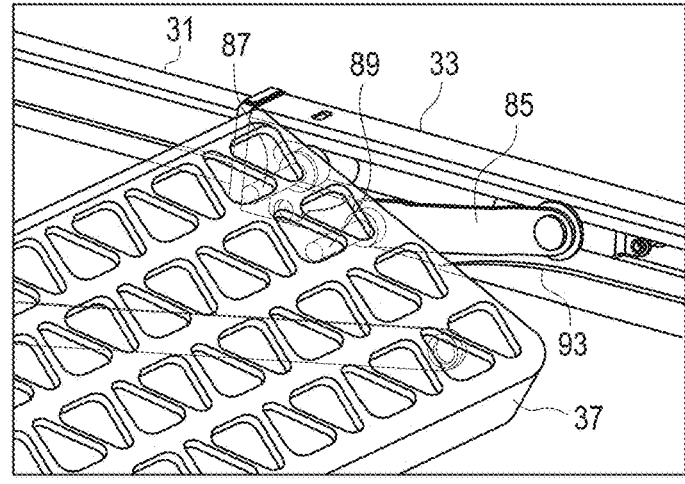
FIG. 41 is a portion of the view of FIG. 40 with the step rotated partly back to a position for stowing.
Figure 42:
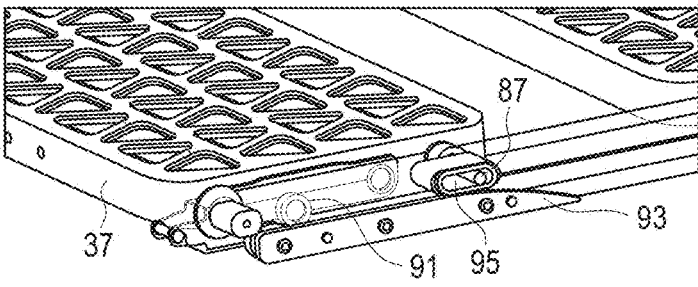
FIG. 42 is a different, perspective, partial view of the alternative control means with the step rotated parallel with the slide arm for stowing.

Alternative control means may be employed as illustrated in FIGS. 40 to 42. The control means comprises a roller mounted to one of the first step and the at least one additional step which translates rotationally over a ramp mounted to at least one of the carrier arms. A step control link 85 is rotationally connected at one end to the second step 37 and at the other end to a slide arm 31. A slide arm pivot pin 87 rotationally connecting the slide arm 31 and the second step 37, and a step pivot pin 89 rotationally connecting the step control link 85 and the second step 37, provide axes of rotation for the second step 37. Mounted rotationally along the step control link 85 is a guide roller 91. When the slide arm 31 is urged into its associated carrier arm 33, the guide roller 91 contacts a ramp 93, or guide cam. As the guide roller 91 rolls along the guide cam 93, the second step 37 is rotated to a horizontal orientation in relation to the slide arm 31. By contrast, when the slide arm 31 extends away from the carrier arm 33, the guide roller 91 rides down the guide cam or ramp 93 to rotate the second step 37 away from horizontal in relation to the slide arm 31. The slide arm pivot pin 87 is guided in a slide arm pivot pin slot 95 to accommodate the geometric relation between the slide arm pivot pin 87 and the step pivot pin 89 as the second step 37 rotates.

As discussed above, alternative latching means may be employed. Referring to FIGS. 34 to 37, in a further embodiment, the latch release handle 29 is connected to at least one lateral arm 69 which rotates at least one longitudinal locking rod 71 located between at least one of the slide arms 31 and its associated carrier arm 33. The locking rod 71 is provided with a spring-loaded pawl 73 adapted to lock into locking slots 75 in at least one of the carrier arms 33 and its associated frame arm 11, 13. The spring-loaded pawl 73 may be fixedly mounted circumferentially to the locking rod 71, or otherwise. When the spring-loaded pawl 73 is shaped appropriately, such as extending outwardly from the locking rod 71 significantly on one axis and minimally on an orthogonal axis, when biased by the spring, the outwardly projecting portion or portions of the spring-loaded pawl 73 may drop into one or more of several provided locking slots 75 located at intervals along the length of at least one of the slide arms 31 and its associated carrier arm 33. Any number of locking slots 75 may be selected for a desired number of locking positions.

Referring to FIGS. 38A to 39B, another beneficial feature which may be added to the stowable tailgate step assembly 1 is a load stop 79. Load stops are useful to hold certain cargo 81 in the cargo bed of a pick-up truck. For example, when transporting sheets of plywood or dry wall, which may extend beyond the cargo bed, the tailgate 5 must be lowered from its normal, upright, closed position. With the tailgate 5 lowered to parallel with the cargo bed, the cargo bed is effectively extended by the tailgate 5. The cargo 81, without a closed tailgate 5, however, is now unrestrained from rearward motion. Accordingly, the load stop 79 is preferably rotatably mounted on an upwardly oriented face of the step assembly 39, such as to the step 37 closest to the rear cross-piece 27. A hinge or hinges rotationally connecting the step assembly 39 and the load stop 79 may be used to permit this rotation. The hinges may be located at an aft end of the step assembly 39, for example, on the step 37. The load stop 79 may be a solid flap or may be formed, for example, like an arched rod or tube. Multiple shapes and forms of the load stop 79 are possible.

It is preferable that the load stop 79 be mounted flush with the upward face of the step assembly 39 which faces upwardly when the tailgate 5 is open to parallel with the cargo bed. A recess 83 in the upward face of the step 37 facilitates this flush mounting. This allows cargo 81 to be loaded and unloaded over the open tailgate 5 more easily without presenting a physical impediment. This flush mounting of the load stop 79 is also preferable for visual appearance and safety whenever the load stop 79 is not in use, whether or not the tailgate 5 is open. With the cargo 81 loaded, the load stop 79 may be rotated upright. A simple latch may be used to hold the load stop 79 in its upright position and to release it to be stowed flush with the step assembly 39. Alternatively, the load stop 79 may be connected to the locking rod 71 and spring-loaded pawl 73 mechanism, so that rotation of at least one spring-loaded pawl 73 into a locking slot 75 may lock the load stop 79 in place. Alternatively, a ratchet (not illustrated) may be associated with the slide module 25 to allow the load stop 79 to be moved in small increments to be snug against the cargo 81, and when released to allow the load stop 79 to be moved far enough back from the cargo 81 to be again stored in the step assembly 39.

Other means to create the same result within the context of this invention will be apparent to those skilled in the art.

Although particular component arrangements are disclosed in the illustrated embodiments, other arrangements will benefit from this invention.

What is claimed is:

1. A stowable tailgate step assembly system comprising:
a frame with two interconnected frame arms adapted to be mounted longitudinally in a vehicle tailgate;
the frame adapted to receive a slide module which is releasably latched to the frame;
the slide module comprising two longitudinal carrier arms which translate in relation to the frame arms;
the slide module further comprising a step assembly;
the step assembly comprising two slide arms which translate in relation to the carrier arms;
the step assembly further comprising a first step and at least one additional step pivotally connected by at least one link rod to facilitate synchronous rotation of said steps;
control means to control rotation of said steps during translation of the carrier arms between a stowed position and an extended position;
deployment means to control rotation of said steps between the extended position and a deployed position;
a lock-out latch rotationally connected to at least one of the carrier arms which engages the at least one of the carrier arms' associated frame arm to prevent translation of the at least one of the carrier arms in relation to the at least one of the carrier arms' associated frame arm when the step assembly is in the extended position;
wherein the lock-out latch disengages from the associated frame arm when the associated frame arm's associated slide arm translates into the at least one of the carrier arms to initiate stowage of the step assembly in the frame.

2. The stowable tailgate step assembly system of claim 1, wherein the control means comprises a guide pin mounted to one of the first step and the at least one additional step which engages a shaped guide slot adjacent an end of at least one of the carrier arms.

3. The stowable tailgate step assembly system of claim 1, wherein the control means comprises:
a first guide pin mounted to the first step;
a guide bracket mounted to one of the carrier arms, the guide bracket comprising a shaped guide slot to receive the first guide pin;
wherein the first guide pin is constrained from vertical movement by a motion control surface of the carrier arm and by the respective slide arm when the first guide pin is outside the shaped guide slot.

4. The stowable tailgate step assembly system of claim 1, wherein the control means comprises a roller mounted to one of the first step and the at least one additional step which translates rotationally over a ramp mounted to at least one of the carrier arms.

5. The stowable tailgate step assembly system of claim 1, wherein the deployment means comprises the steps pivotally connected to the slide arms with pivot pins, the steps being coplanar with the slide arms prior to deployment but rotating in relation to the slide arms to be parallel with a truck cargo bed when deployed, the steps pivotally connected to each other by the at least one link rod to ensure synchronous and parallel rotation of the steps; at least one guide pin mounted at a lateral side of at least one of the steps, the guide pin contacting a motion control surface on the carrier arm to maintain the steps coplanar with the slide arms during deployment of the step assembly; a guide bracket including a guide slot located adjacent an aft end of the carrier arm to reversibly receive the guide pin, the guide slot shaped to impose a rotation of the step onto which the guide pin is mounted.

6. The stowable tailgate step assembly system of claim 1, wherein the lock-out latch releasably engages a lock-out pin mounted to the step assembly to prevent extension of the step assembly in relation to the carrier arms until the slide module exits the frame.

7. The stowable tailgate step assembly system of claim 1, wherein the slide module is releasably latched to the frame by at least one assembly latch which is released by means of a latch release handle.

8. The stowable tailgate step assembly system of claim 1, wherein the tailgate step assembly is in the stowed position when latched by at least one assembly latch, in the extended position when the at least one assembly latch is released and the slide module translates in relation the frame to a limit, and in the deployed position when the steps rotate from the extended position to a use position.

9. The stowable tailgate step assembly system of claim 7, wherein the latch release handle is connected to at least one lateral arm which rotates at least one locking rod located between at least one of the slide arms and the at least one of the slide arms' associated carrier arm, the locking rod provided with a spring-loaded pawl adapted to lock into locking slots in at least one of the carrier arms and the at least one of the carrier arms' associated frame arm.

10. The stowable tailgate step assembly system of claim 1, further comprising a load stop rotatably mounted in an upward face of the step assembly.

11. The stowable tailgate step assembly system of claim 10, wherein the load stop lies recessed in the first step when not in use.

12. The stowable tailgate step assembly system of claim 9, wherein a load stop rotatably mounted to an upward face of the step assembly, when rotated perpendicular to the step assembly, is locked in place by means of the spring-loaded pawl engaging a locking slot in at least one of the carrier arms and the at least one of the carrier arms' associated frame arm.

13. The stowable tailgate step assembly system of any of claims 10, 11 and 12, wherein a spring-loaded ratchet connected to the load stop and to one of the carrier arms and the one of the carrier arms' associated slide module allows the load stop to be moved in multiple increments to be snug against a cargo, and releasing said ratchet allows the load stop to be moved far enough back from the cargo to be stored in the step assembly.

14. The stowable tailgate step assembly system of claim 4, wherein the ramp comprises a guide cam.

* * * * *